Figure 5:
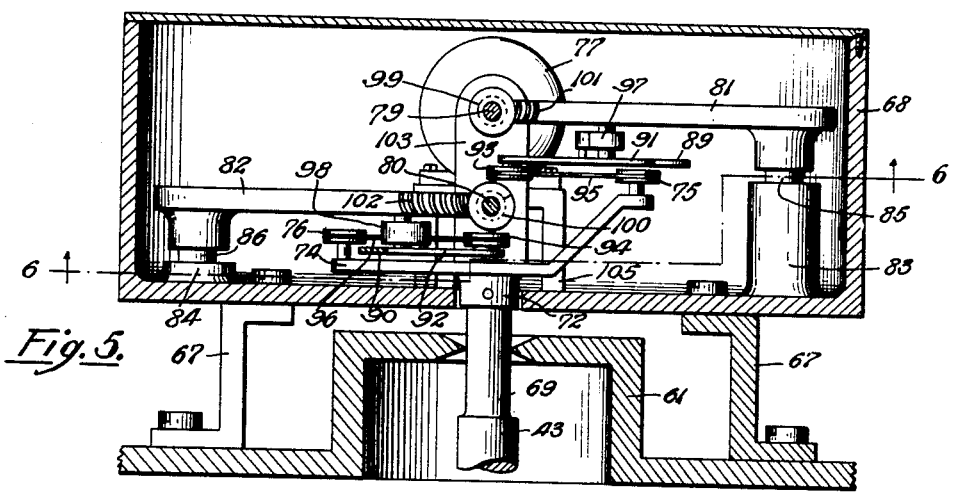

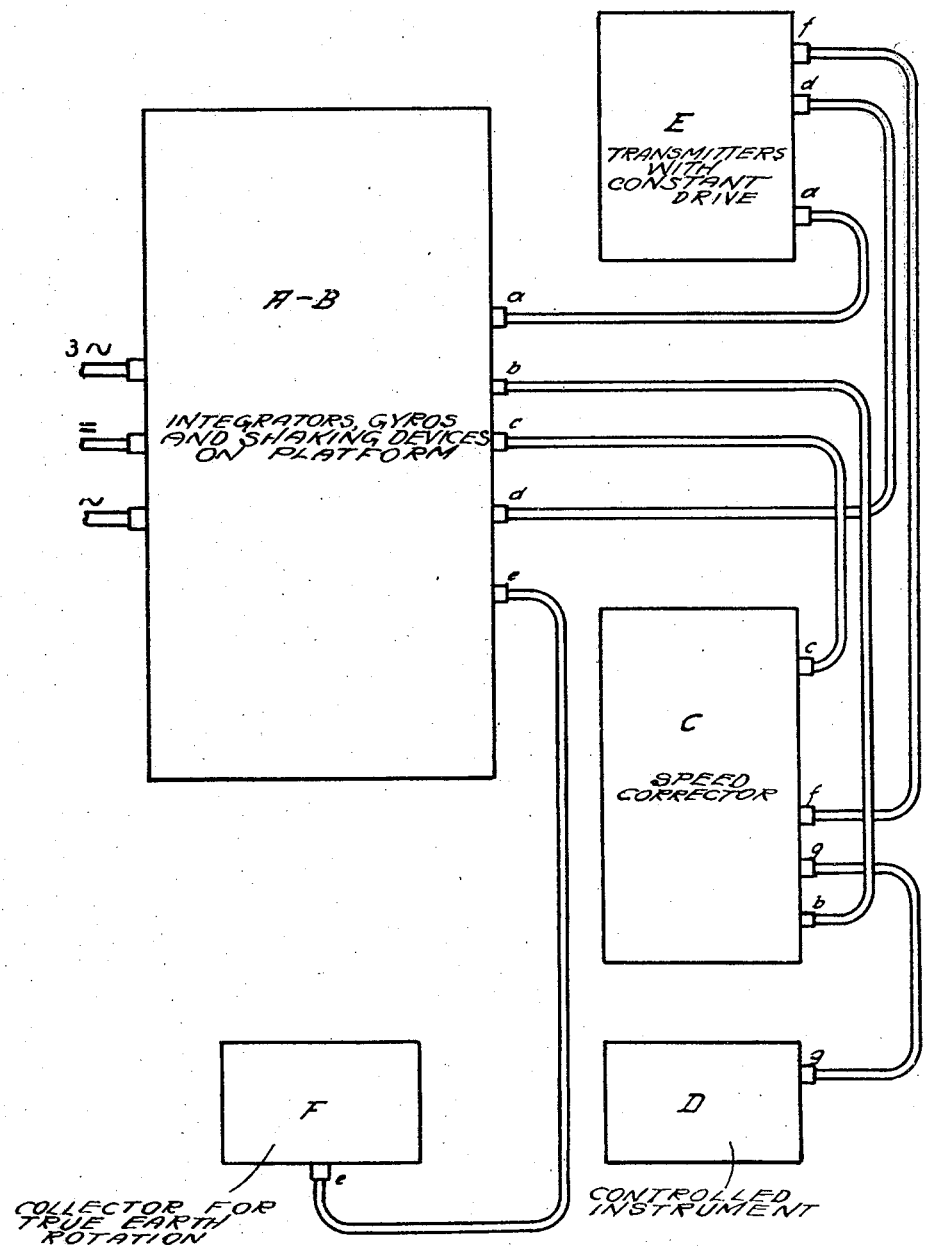

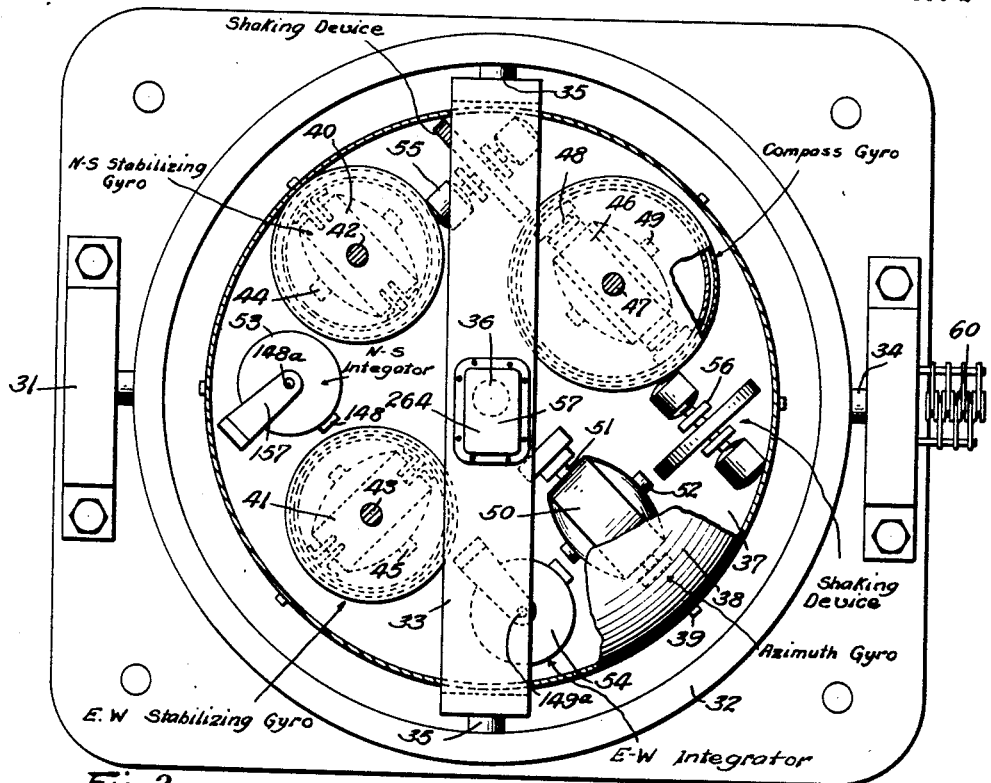
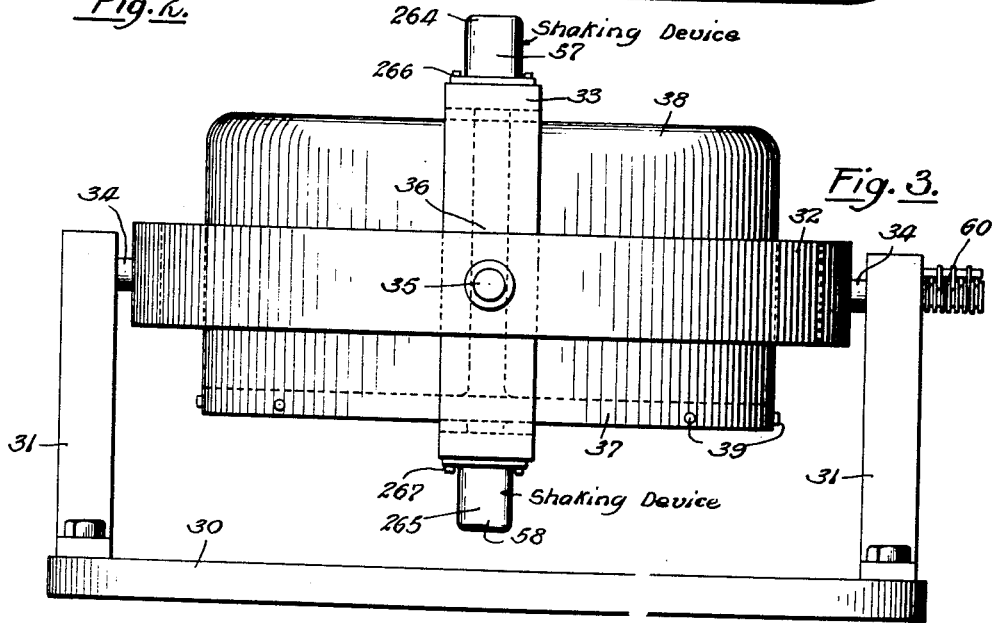

July 16, 1940.    J. M. BOYKOW    2,208,207
STABILIZING AND ORIENTING APPARATUS
Original Filed Jan. 10, 1934    16 Sheets-Sheet 3
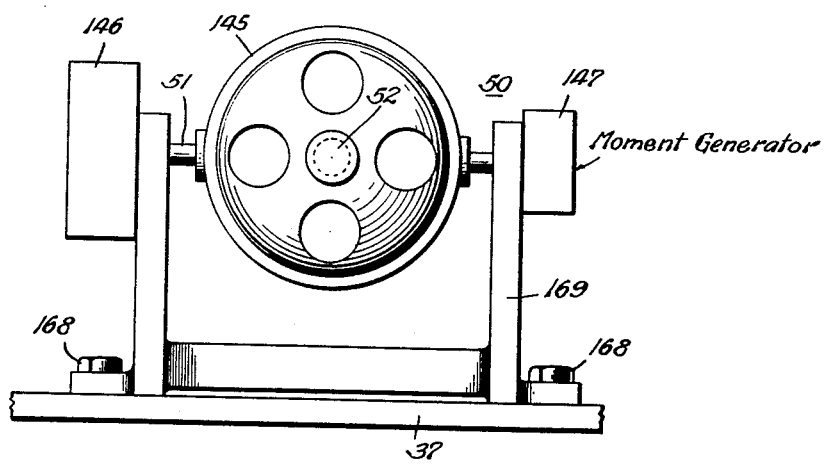
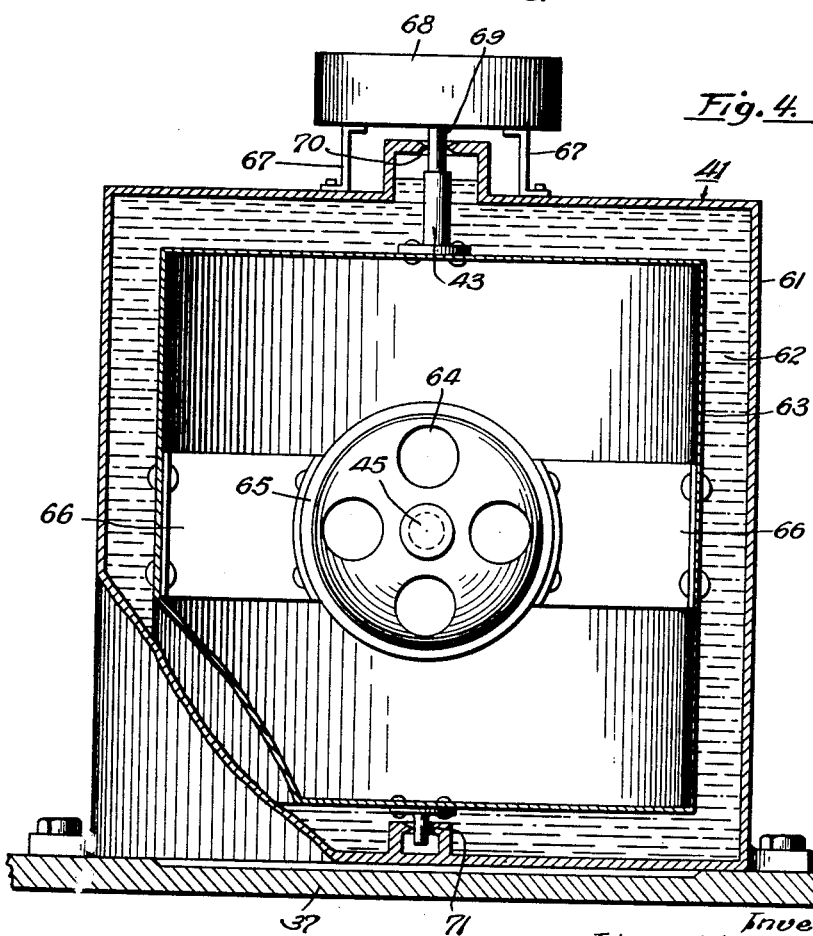
Inventor:
Johann Maira Boykow, deceased,
By Bianca Boykow, Erika Boykow, and
Johann Maria Boykow, Sole Heirs.
by Socka & Kehlenbeck
attorneys July 16, 1940. J. M. BOYKOW 2,208,207
STABILIZING AND ORIENTING APPARATUS
Original Filed Jan. 10, 1934 16 Sheets-Sheet 4

Inventor;
Johann Maria Boykow,
deceased,
By Bianca Boykow, Erica Boykow,
and Johann Maria Boykow, Sole Heirs July 16, 1940.  J. M. BOYKOW  2,208,207
STABILIZING AND ORIENTING APPARATUS
Original Filed Jan. 10, 1934   16 Sheets-Sheet 5

Inventor,
Johann Maria Boykow, deceased,
By Bianca Boykow, Erika Boykow and
Johann Maria Boykow, Sole Heirs.

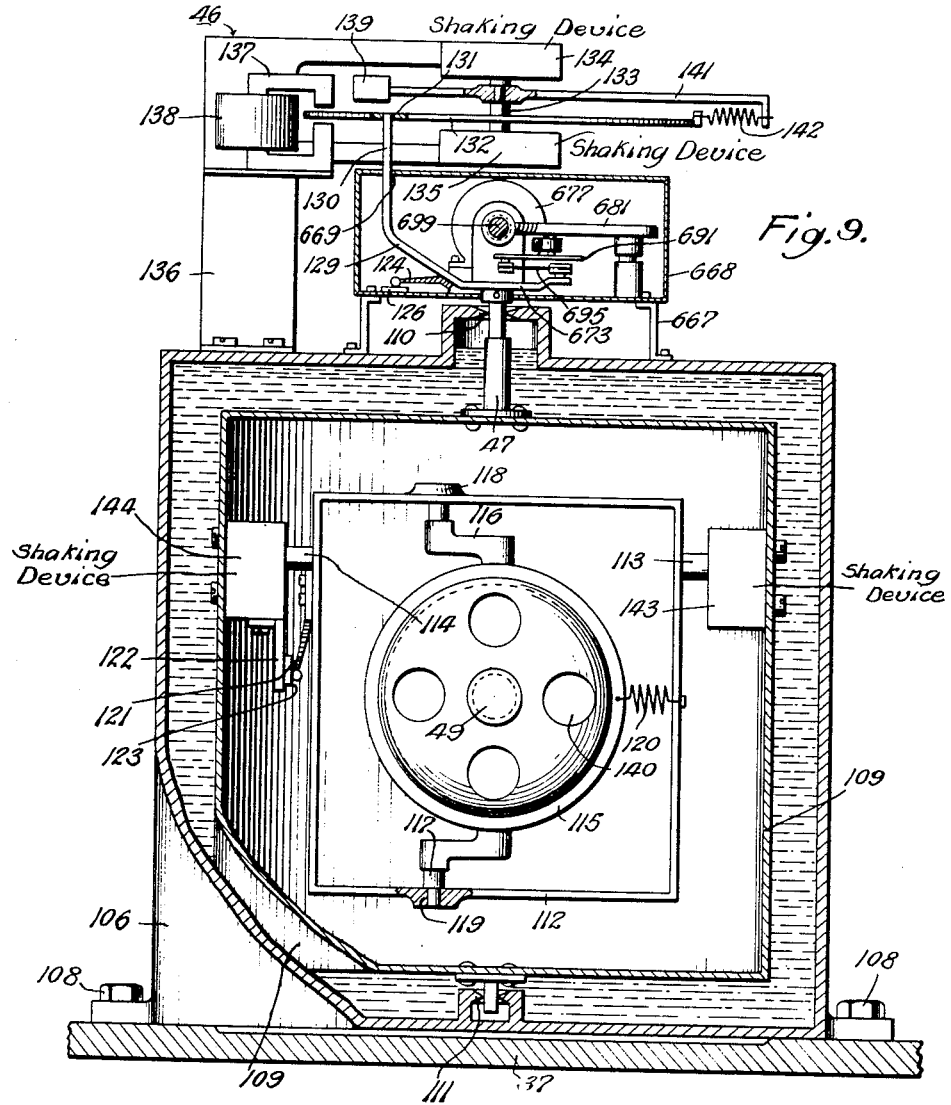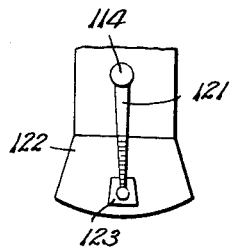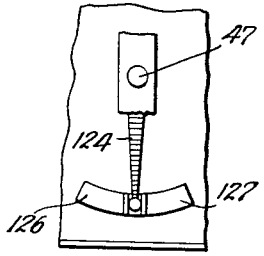

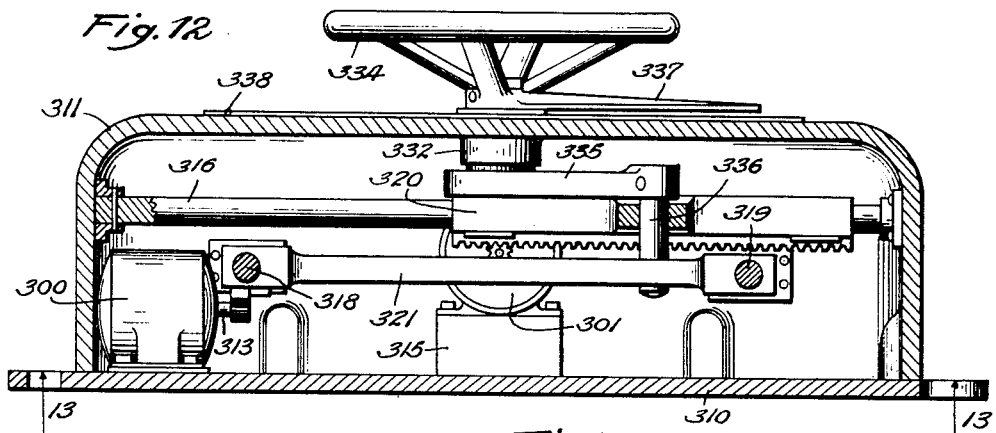
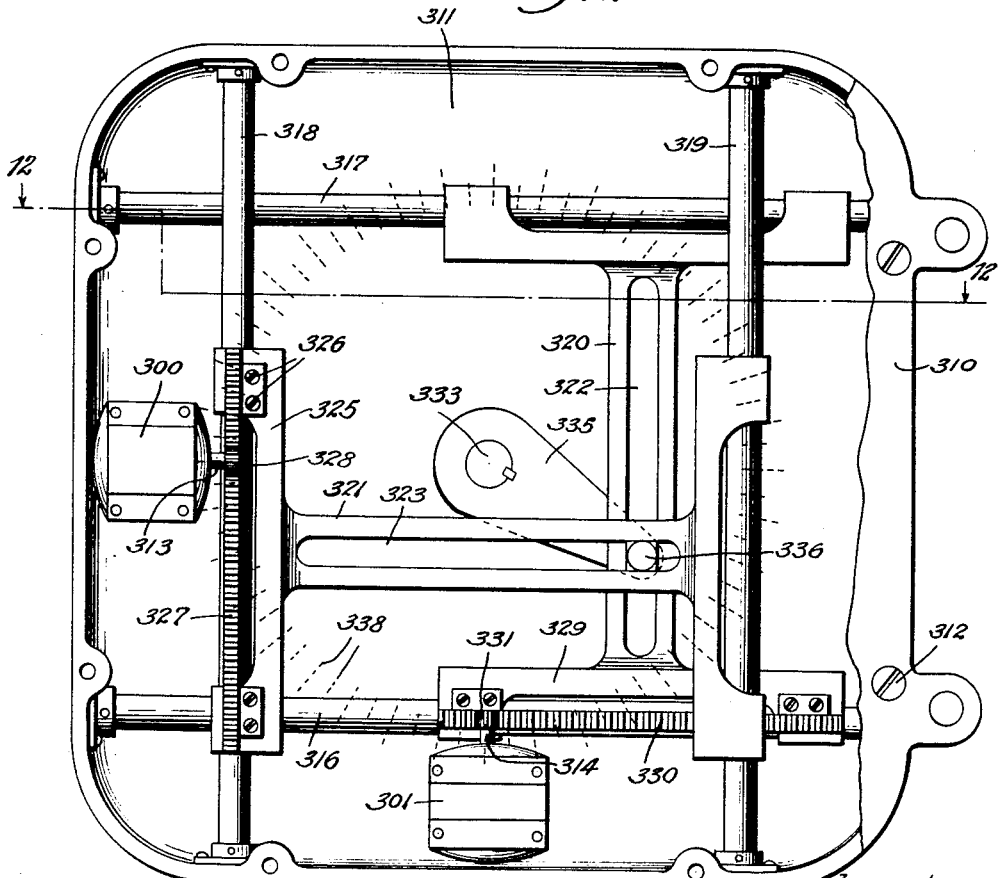

July 16, 1940.　　　　J. M. BOYKOW　　　　2,208,207
STABILIZING AND ORIENTING APPARATUS
Original Filed Jan. 10, 1934　　16 Sheets-Sheet 8

Inventor,
Johann Maria Boykow, deceased,
By Bianca Boykow, Erika Boykow and
Johann Maria Boykow, Sole Heirs.

July 16, 1940.  J. M. BOYKOW  2,208,207
STABILIZING AND ORIENTING APPARATUS
Original Filed Jan. 10, 1934  16 Sheets-Sheet 9
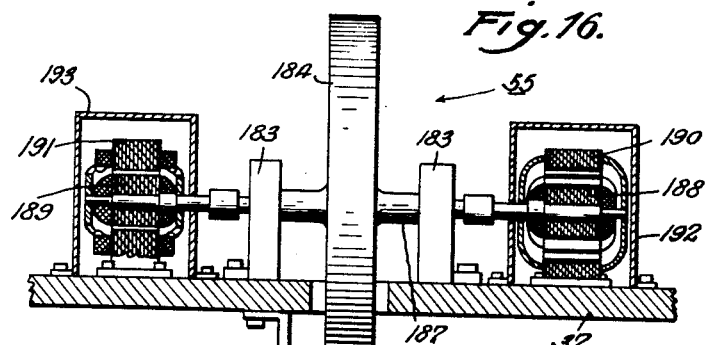
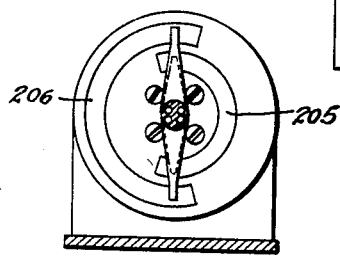
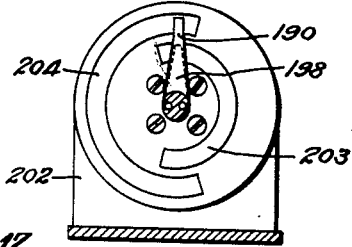
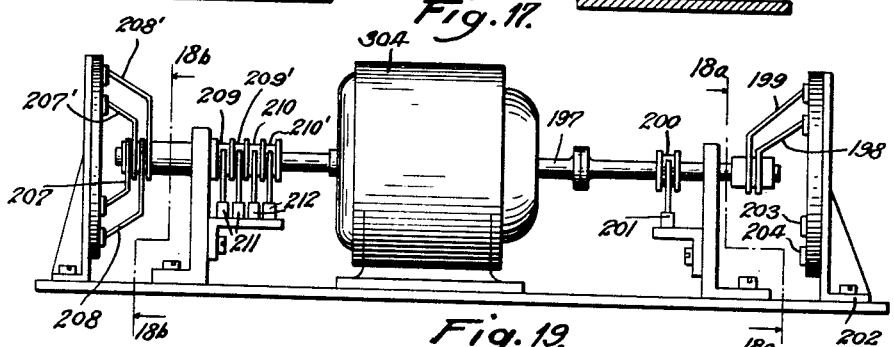
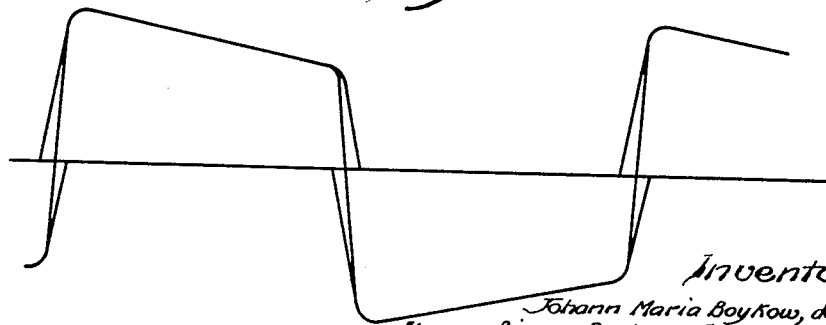
Inventor:
Johann Maria Boykow, deceased,
Bianca Boykow, Erika Boykow and
Johann Maria Boykow, Sole Heirs.

July 16, 1940.  J. M. BOYKOW  2,208,207
STABILIZING AND ORIENTING APPARATUS
Original Filed Jan. 10, 1934   16 Sheets-Sheet 11

INVENTOR.
JOHANN MARIA BOYKOW DECEASED BY
BIANCA BOYKOW, ERIKA BOYKOW, AND
JOHANN MARIA BOYKOW, SOLE HEIRS
by Erika Kehlenbeck
ATTORNEYS July 16, 1940.  J. M. BOYKOW  2,208,207
STABILIZING AND ORIENTING APPARATUS
Original Filed Jan. 10, 1934   16 Sheets-Sheet 13

INVENTOR
JOHANN MARIA BOYKOW DECEASED
BIANCA BOYKOW, ERIKA BOYKOW, AND
BY JOHANN MARIA BOYKOW, SOLE HEIRS.
ATTORNEYS

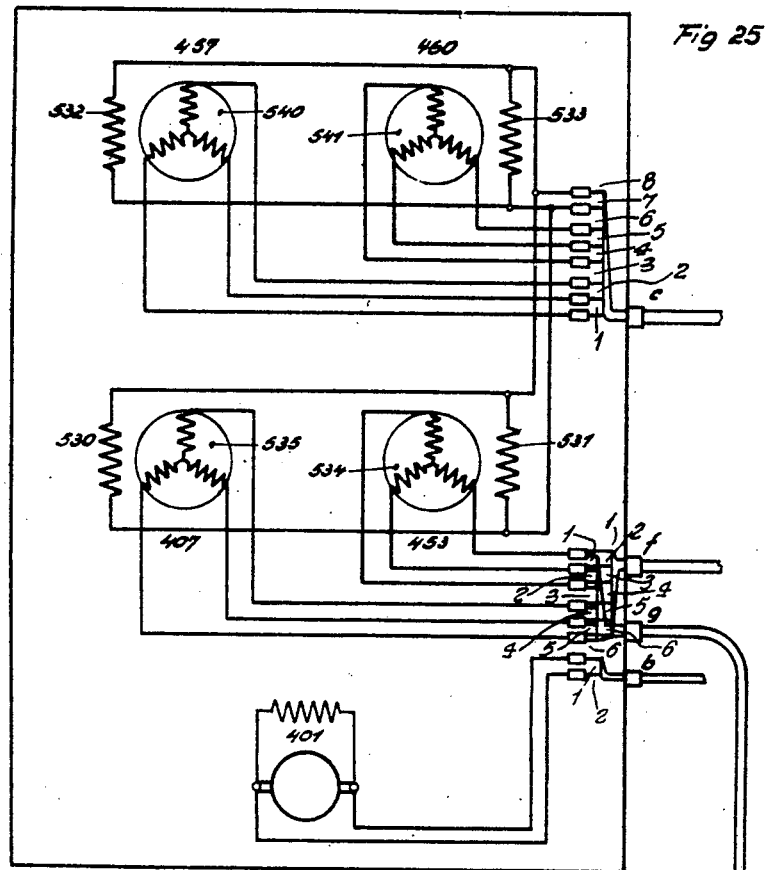
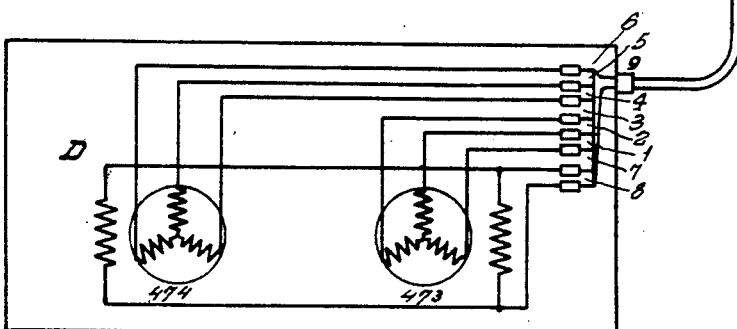

July 16, 1940.                    J. M. BOYKOW                    2,208,207
                        STABILIZING AND ORIENTING APPARATUS
              Original Filed Jan. 10, 1934        16 Sheets-Sheet 15
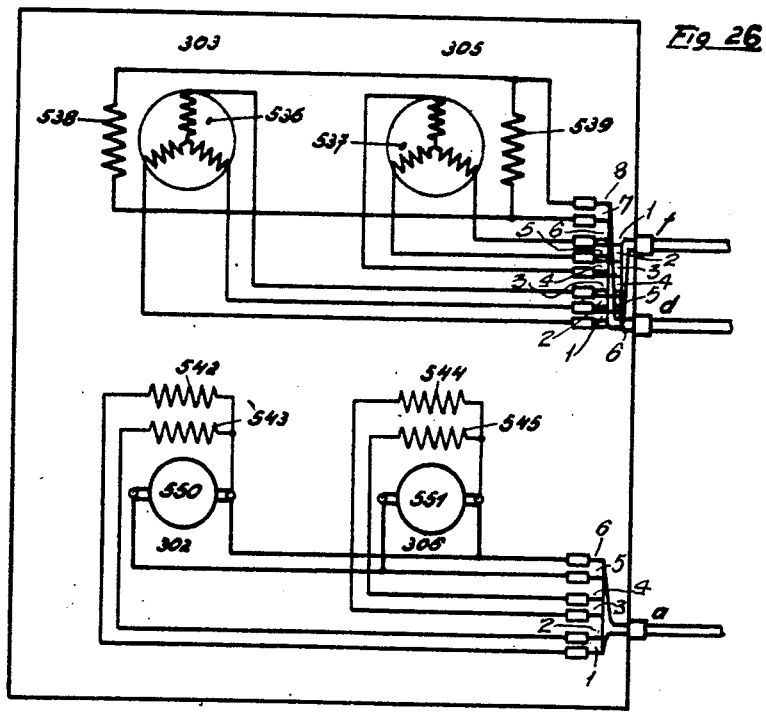
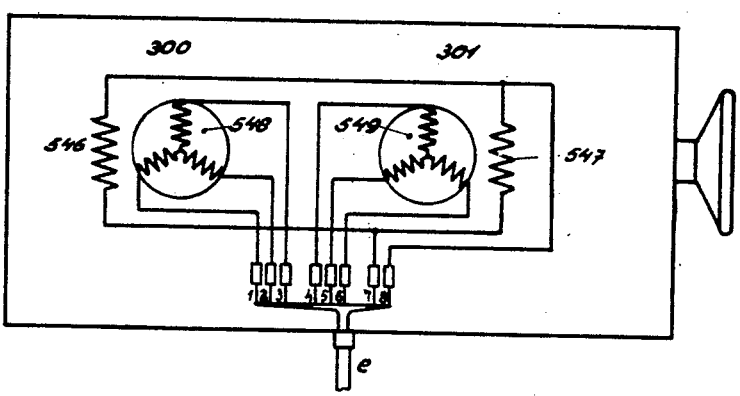
INVENTOR
JOHANN MARIA BOYKOW DECEASED BY
BIANCA BOYKOW, ERIKA BOYKOW, AND
JOHANN MARIA BOYKOW, SOLE HEIRS.
by
ATTORNEYS July 16, 1940.  J. M. BOYKOW  2,208,207
STABILIZING AND ORIENTING APPARATUS
Original Filed Jan. 10, 1934   16 Sheets-Sheet 16
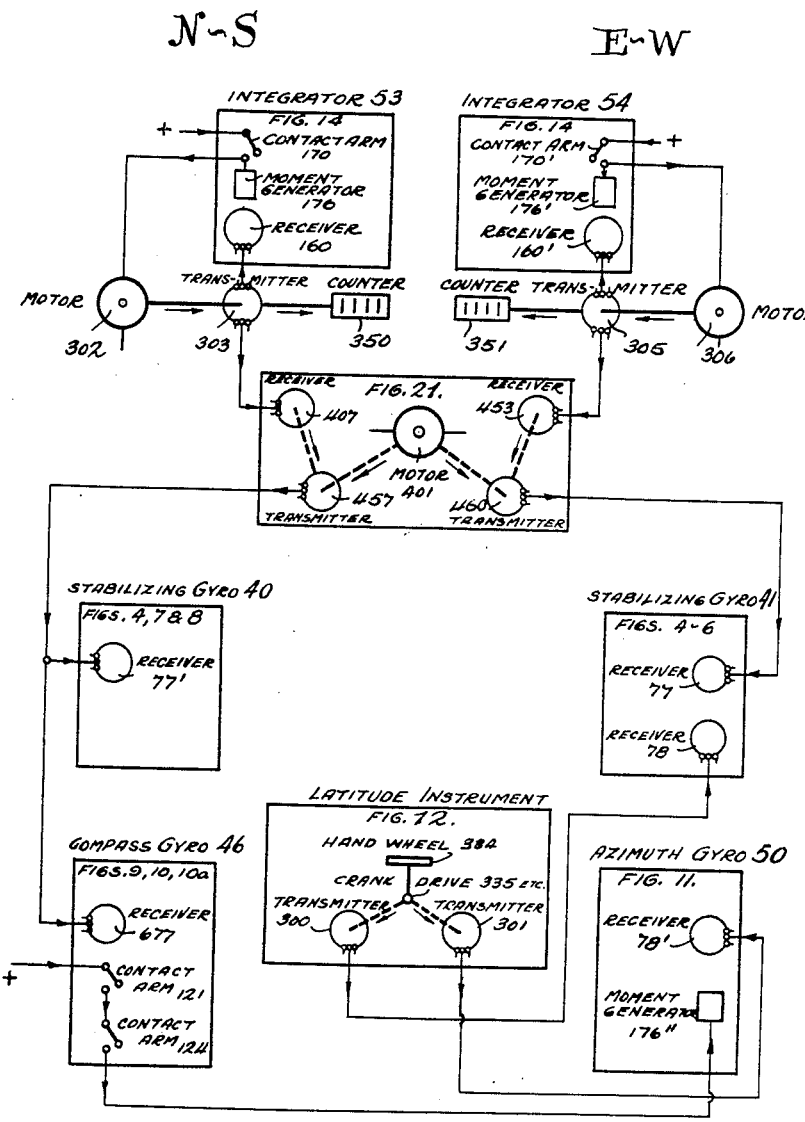

Patented July 16, 1940

2,208,207

UNITED STATES PATENT OFFICE

2,208,207

STABILIZING AND ORIENTING APPARATUS

Johann Maria Boykow, deceased, late of Berlin-Lichterfelde, Germany, by Bianca Boykow, Erika Boykow, and Johann Maria Boykow, Bad Wiessee, Bavaria, Germany, sole heirs, assignors to Deutsche Luftfahrt-und Handels-Aktiengesellschaft, Berlin, Germany, a corporation of Germany Original application January 10, 1934, Serial No. 705,997, now Patent No. 2,109,283, dated February 22, 1938. Divided and this application January 22, 1938, Serial No. 186,360

32 Claims. (Cl. 33—204)

This invention relates to a stabilized structure for navigational instruments, the present application being a division of an application filed in the United States Patent Office by the said Johann Maria Boykow, deceased, which application matured into Patent No. 2,109,283, February 22, 1938.

Many instruments for indicating navigational factors, as for instance the instrument disclosed in the aforementioned parent application, require that either the entire instrument or at least parts thereof should not partake in the oscillating movements of the craft equipped with such instrument. The main object of the present invention is to provide a platform which is horizontally stabilized and which may be orientated with respect to a certain earth direction, such platform to be serviceable as a carrier for instruments requiring a stabilized and directed base.

A further object of the invention is to provide a stabilized platform for an "integrator," and more particularly for integrators of the type claimed in said parent application, which serve for finding the speed and distance traveled from accelerations of the craft equipped with the integrators, and to use the movements of the integrators for correcting the working of the platform-stabilizing means.

A further object of the invention is to provide means whereby gyros mounted on the platform and serving as stabilizing and directing means will be safeguarded against incorrect operation due to bearing friction and to certain external influences.

The invention consists of a platform on which are mounted gyros which exert a stabilizing influence to hold the platform horizontal, and other gyros for keeping the platform in a desired direction.

The invention further consists of means for bringing about certain influences interacting between the various gyros in order to correct their working.

The invention further consists of means for correcting the working of such gyros with the help of the integrators.

The invention further consists of a platform with two integrators, one of which responds to accelerations in east-west direction, the other to accelerations in north-south direction, said platform being gimbal-suspended and stabilized by two gyros, one for each of the integrators, said platform being also provided with a compass gyro as well as with an azimuth gyro.

The invention further comprises shaking devices for neutralizing the effect of bearing friction.

Further objects and details of the invention will be apparent from the description following hereinafter and from the annexed drawings illustrating an embodiment of the invention by way of example.

Figure 6:
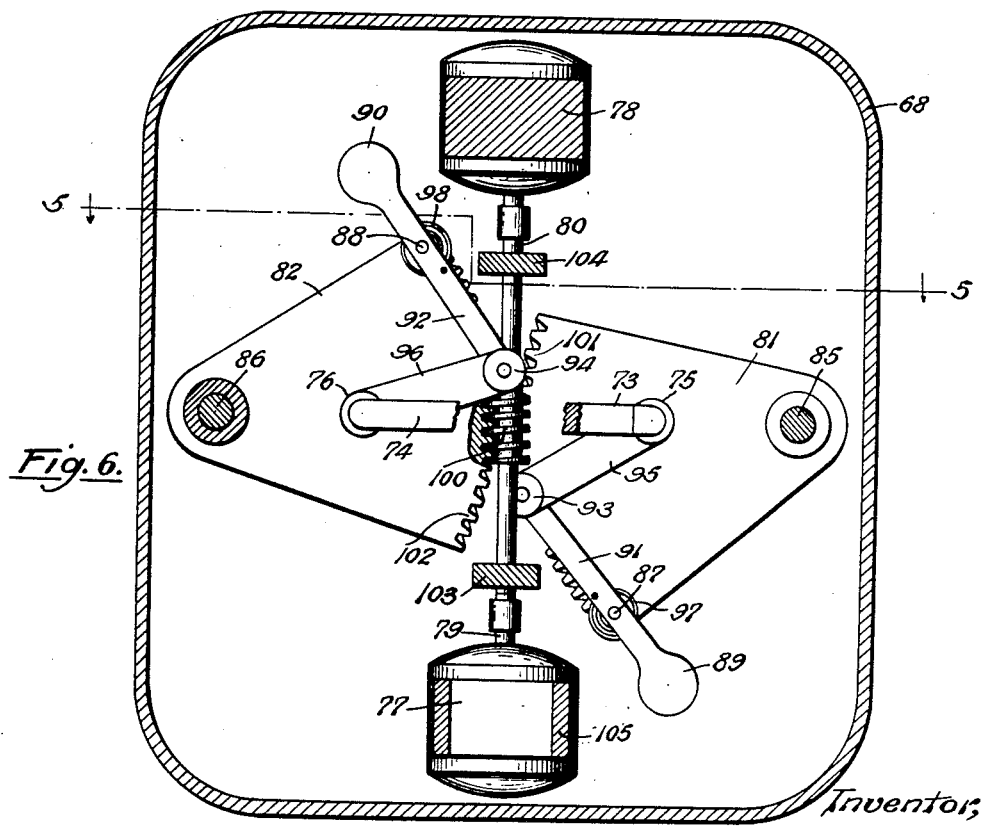
Figure 7:
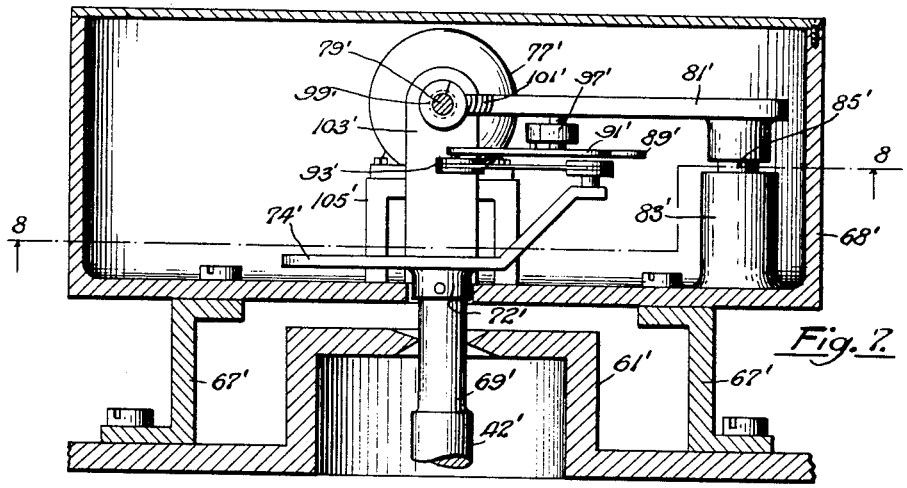
Figure 8:
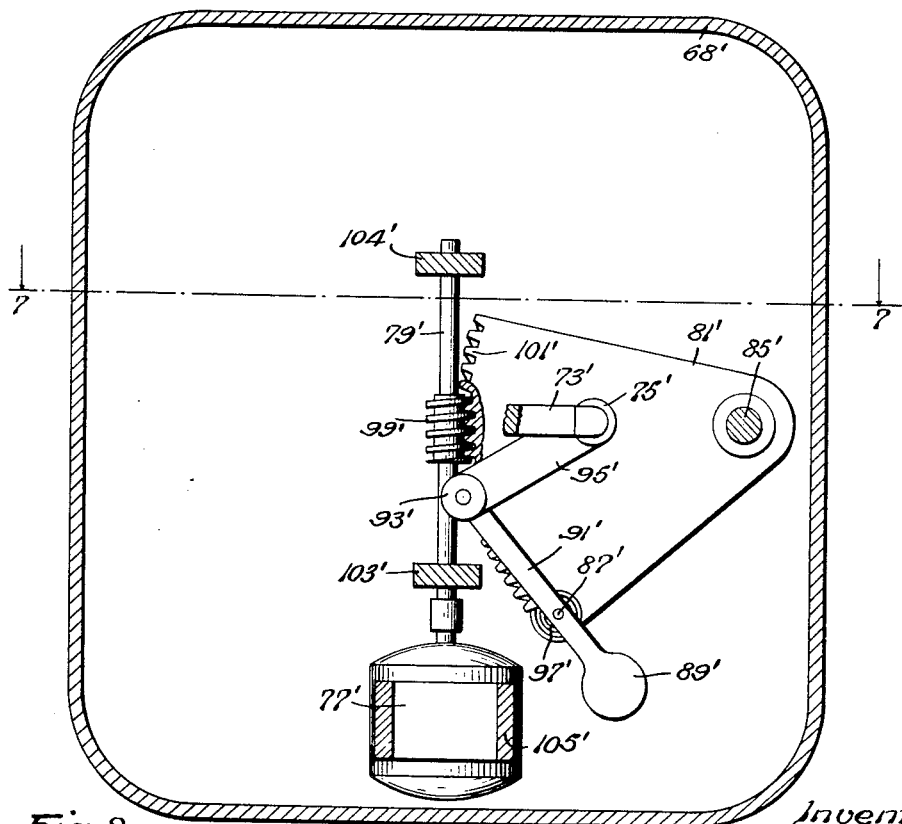
Figure 14:
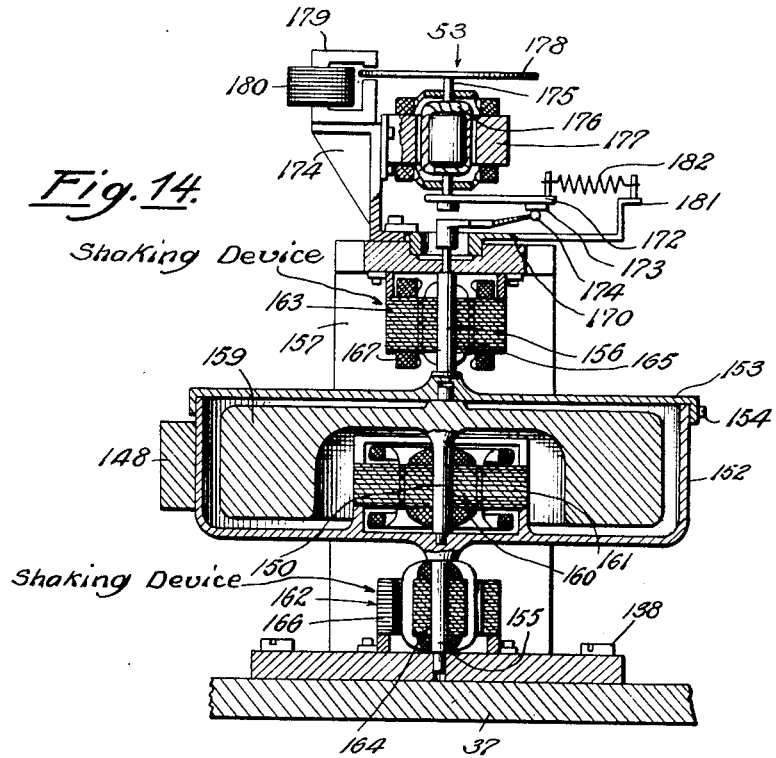
Figure 15:
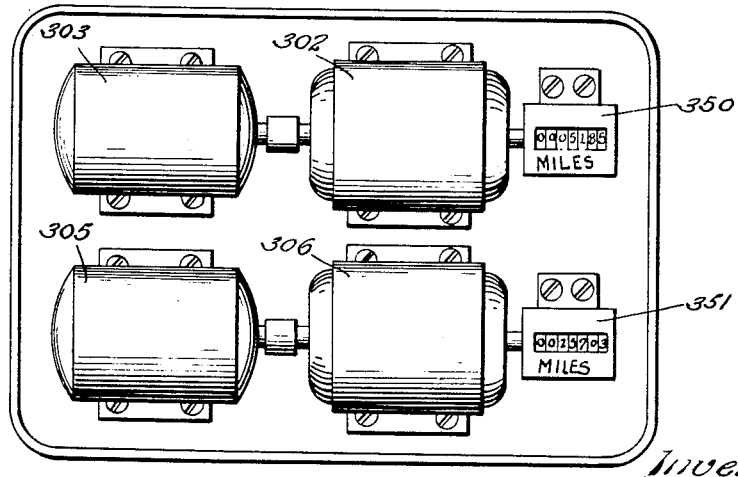
Figure 20:
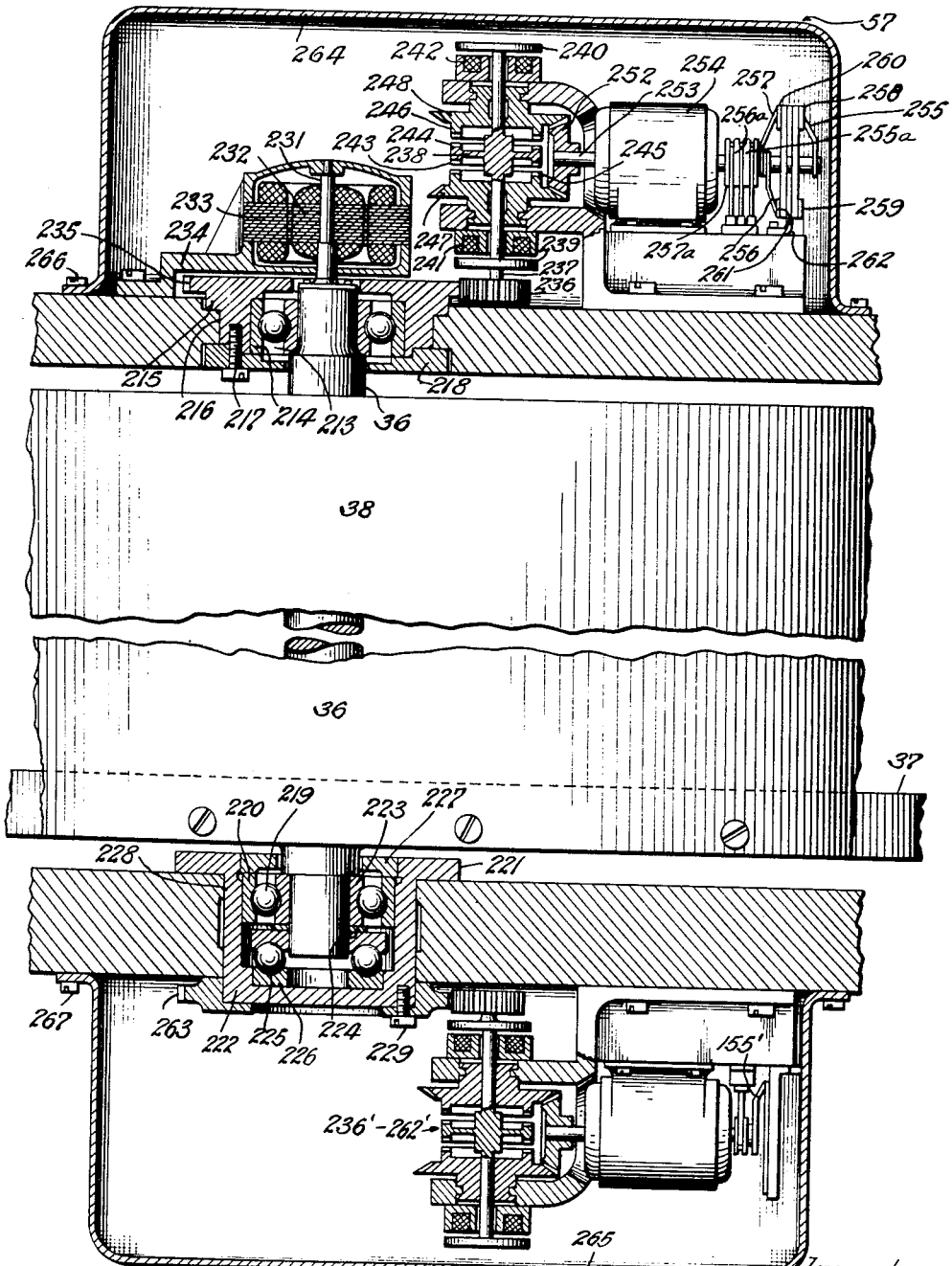
Figure 21:
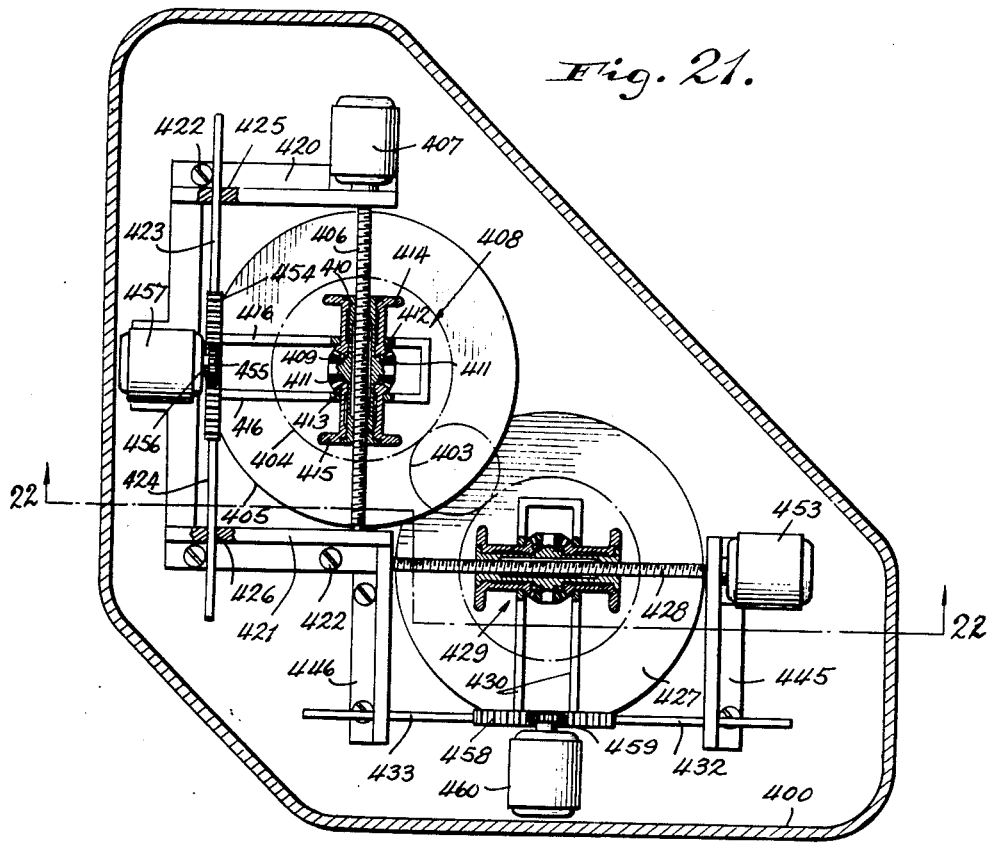
Figure 22:
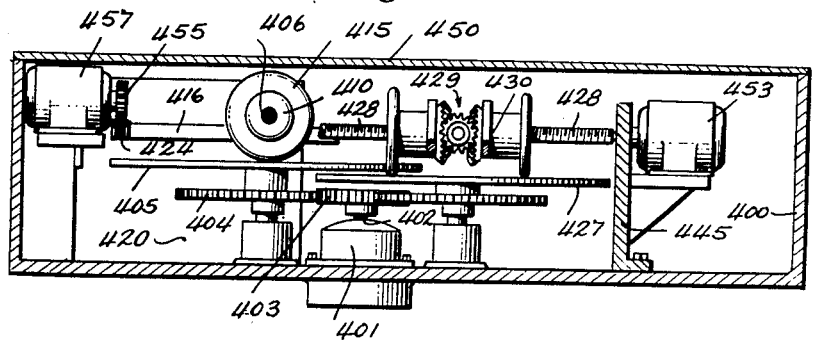
Figure 23:
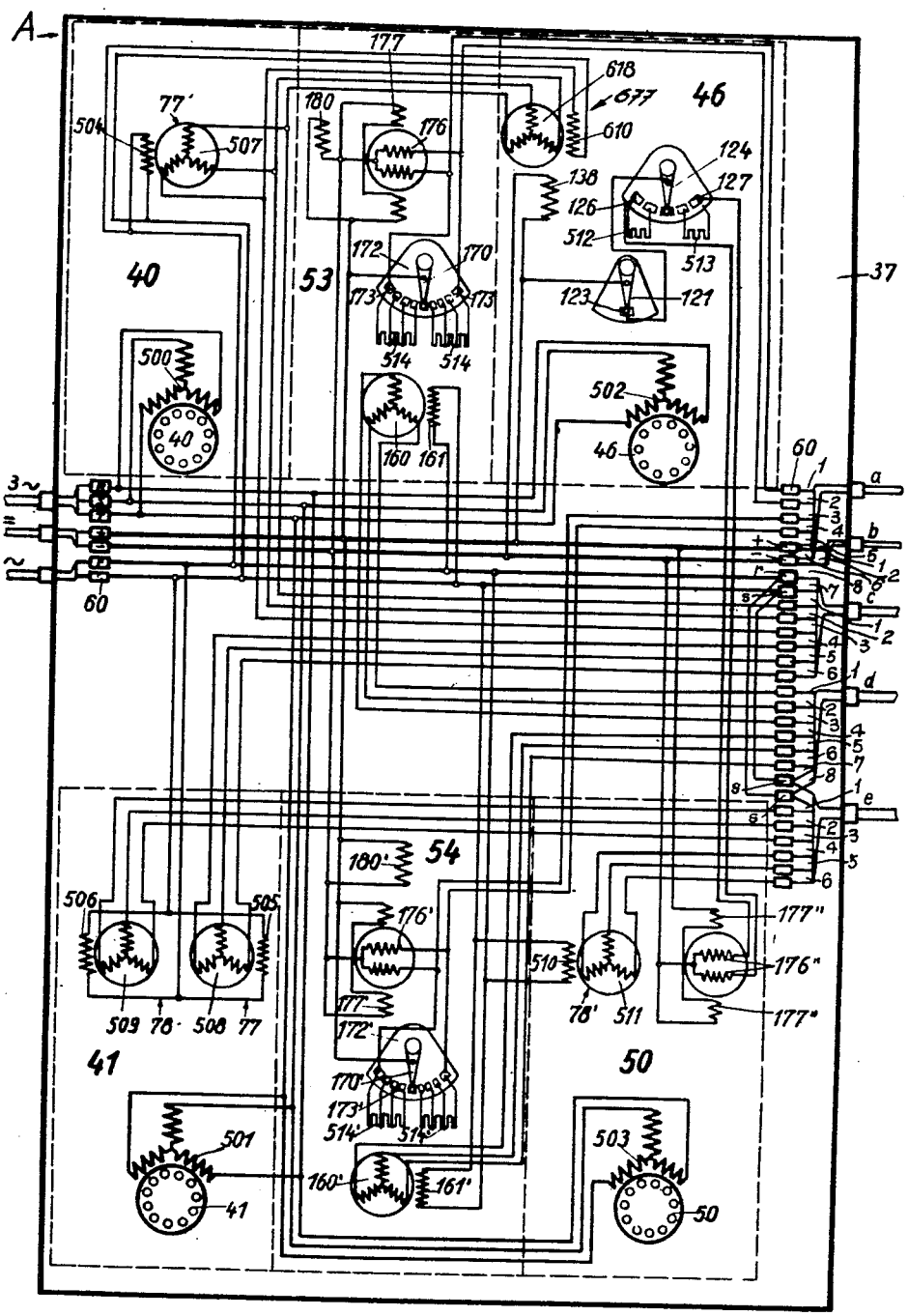
Figure 24:
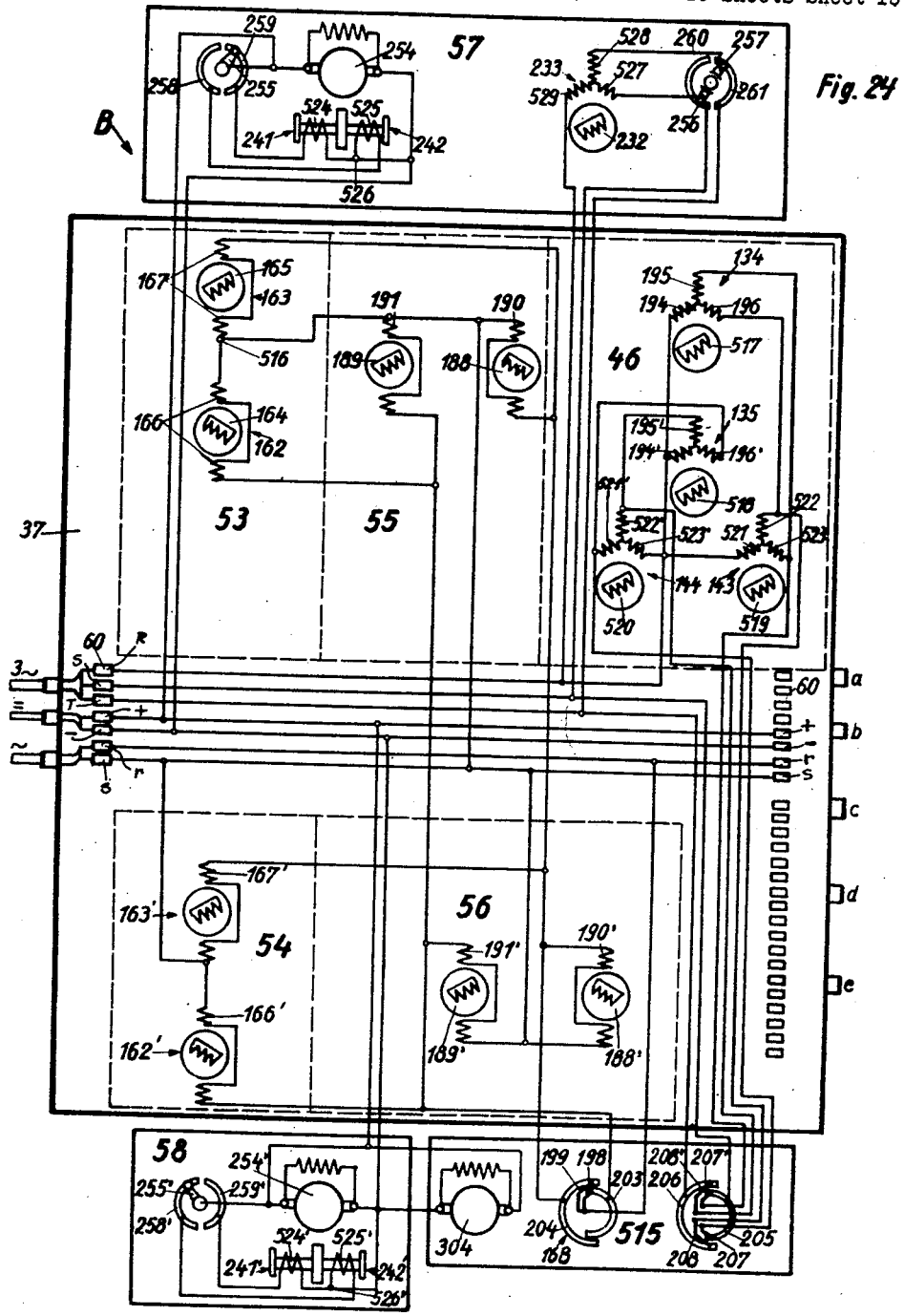

In the said drawings Fig. 1 is a diagrammatic view showing the co-operative groups of apparatus and their main connections; Fig. 2 is a diagrammatic top view of the platform with the apparatus mounted thereon, the protective cover being partly removed; Fig. 3 is a side view thereof; Fig. 4 is a side view of one of the stabilizing gyros, part of the casing and of the gyro float being in section; Fig. 5 is a vertical section of the upper part of Fig. 4 on a larger scale, along line 5—5 of Fig. 5, looking in the direction of the arrow; Fig. 6 is a section along line 6—6 of Fig. 5; Figs. 7 and 8 are sections similar to Figs. 5 and 6 and show the corresponding parts of the other stabilizing gyro; Fig. 9 is a vertical section of the compass gyro arrangement; Figs. 10 and 10a are different views of parts thereof; Fig. 11 is a diagrammatic side view of the azimuth gyro; Fig. 12 is a section along line 12—12 of Fig. 13, showing a transmitter rotating device for corrections according to the true earth rotation; Fig. 13 is a section along line 13—13 of Fig. 12; Fig. 14 is a vertical section of an integrator with the associated parts; Fig. 15 is a top view of a set of motors and transmitters; Fig. 16 is a side view, partly in section, of a shaking device; Fig. 17 is a side view of parts for controlling the shaking device; Figs. 18a and 18b are sections along lines 18a—18a and 18b—18b respectively of Fig. 17; Fig. 19 is a diagrammatic representation of the shaking device; Fig. 20 is a section of another shaking device; Fig. 21 is a top view of a device for performing certain corrections at the stabilizing gyros and the compass gyro; Fig. 22 is a section along line 22—22 of Fig. 21; Fig. 23 is a circuit diagram of group A of Fig. 1; Fig. 24 is a circuit diagram of group B of Fig. 1; Fig. 25 is a circuit diagram of group C of Fig. 1; Fig. 26 is a circuit diagram of group E of Fig. 1; Fig. 27 is a circuit diagram of group F of Fig. 1, and Fig. 28 is a diagram showing the interconnection of the several instruments.

The apparatus consists of a plurality of individual instruments and auxiliary apparatus which will be treated hereinafter in individual groups. These groups of instruments may either be arranged all on a common base or platform, or such of them as do not require a stabilized base may be mounted separately at suitable points of the craft. In the latter case, they need only to be interconnected by electric wires.

Group A comprises the integrators and the gyros for stabilizing and directing the platform on which they are mounted.

Group B comprises the shaking devices for preventing the incorrect operation due to the bearing friction in the instruments of group A.

Group C comprises a device for making certain corrections according to the speed of the craft.

Group D comprises an instrument which may be connected to the apparatus according to the present invention but does not form part of the subject-matter claimed in the present application.

Group E comprises two transmitters with constant drive by two motors.

Group F comprises manually operated transmitters for making corrections according to the true earth rotation.

$3\sim$ denotes a three-phase current lead which thus contains three wires, $=$ denotes a direct current line which consists of two conductors, and $\sim$ denotes a single-phase current line likewise consisting of two conductors. The current sources not represented here may be of any kind as long as they supply current of the character and strength required. Letters $a$ to $g$ signify groups of conductors of each of the aforementioned groups A to F, shown in Figs. 23 to 27.

The terms "receivers" and "transmitters" used below in the description and in the claims, are to be understood as referring to apparatus of the character frequently employed on board ship in the form of engine telegraphs in which a rotatable part of the transmitter causes a rotatable part of a receiver to rotate through the same angle. Such transmitters and receivers may have armatures with three-phase windings and fields with a one-phase winding. An "integrator" in the sense of this invention is an instrument which is adapted to respond to accelerations of the craft in a predetermined direction, and to integrate such accelerations so as to rotate with a speed proportional to the speed of the craft in such direction. An "integrator" may simultaneously be the means for obtaining indications as to the distance traveled in the said direction if the revolutions of the integrator are counted. In connection with the present invention, integrators of any suitable type may be used; it is considered preferable, however, to employ integrators such as claimed in the above-mentioned parent application.

An embodiment of the stabilized and directed platform is illustrated in Figs. 2 and 3. The platform proper 37 is carried by a Cardan structure comprising a base-plate 30, two supports 31 and two gimbal rings 32 and 33. Ring 32 is rotatable about axis 34, and ring 33 about axis 35. 36 is a shaft which supports platform 37, and its axis is arranged at right angles to axis 35 and normally at right angles to 34. A protective cover 38 for the instruments mounted on the platform is attached thereto by suitable means, for instance by screws 39. Means are provided for stabilizing platform 37. For this purpose gyros 40 and 41 are mounted thereon. In a preferred embodiment, these stabilizing gyros 40 and 41 are designed as synchronous motors as shown in Figs. 4 and 23. The gyros are capable of precessing on shafts 42 and 43 respectively. Their impulse shafts 44 and 45 respectively are arranged at right angles to each other, and, if the platform is to be directed north-south, the impulse shafts are preferably parallel and at right angles respectively to the meridian.

In order to maintain platform 37 in a definite direction, and more particularly to maintain it in the north-south direction as will be desirable in most instances, a compass gyro 46 and an azimuth gyro 50 are also mounted on platform 37. Compass gyro 46 has three degrees of freedom, determined by the axis of precession 47, Cardan shaft 48, and impulse shaft 49, the latter being parallel to the meridian when the apparatus is working properly. In the example of Fig. 2, impulse shaft 44 of the one stabilizing gyro 40 is parallel to the impulse shaft 49 of the compass gyro. This is the preferred arrangement; however, other arrangements of the axes in relation to each other may be employed. Azimuth gyro 50 has a horizontal precession axis 51. Its impulse axis 52 may be either horizontal as shown. In this arrangement, the azimuth gyro is the means for turning the platform into the desired direction, and the compass gyro is the means for controlling the azimuth gyro.

Although the stabilizing gyros 40, 41 on the one hand, and the compass gyro 46 and the azimuth gyro 50 on the other hand are the means proper for stabilizing and directing respectively platform 37, they would not be capable of functioning satisfactorily over a considerable length of time unless means are provided for eliminating or neutralizing or correcting certain external and internal influences. Such external influences are caused by the apparent and by the true rotation of the earth, and internal influences are caused by the bearing friction. The apparent rotation of the earth is to be compensated at the stabilizing gyros and the compass gyro proportionally to the components of the craft's speed in the directions of the impulse axes of the gyros. The influence of the true rotation of the earth is to be corrected at the stabilizing gyros and at the aximuth gyro depending upon the geographical latitude. If, however, the impulse axes of the stabilizing gyros are directed north-south and east-west respectively as in the illustrated example, no correction in this respect, that is to say, in respect to the true rotation of the earth, is required at the north-south stabilizing gyro. The internal influences which have to be taken in consideration consist mainly of the bearing friction exerting precession moments at the gyros.

The means for effecting corrections with reference to the apparent rotation of the earth or, what is equivalent thereto, to the speed of the craft, may be controlled either by hand if in each instance the speed is known from other sources, or they may be controlled by a device automatically finding the speed of the craft over ground. Such speed-finding devices may be mounted on the same platform with the gyros 40, 41, 46 and 50. In other words, certain correcting forces may be derived from the same devices which are to be stabilized and directed, and which for this purpose are mounted on the platform in order to allow speed, distance travelled, and location of the craft to be read off accurately on the indicating instruments actuated by said devices.

For this reason, integrators 53 and 54 are preferably arranged on platform 37 in such a manner that integrator 53 is associated with stabilizing gyro 40, and that integrator 54 is associated with stabilizing gyro 41. Any suitable type of integrators as defined above may be used. It is, therefore, by way of example only that there is described hereinafter the use of integrators of the type claimed in the parent Patent 2,109,283, February 22, 1938. The gyros are so arranged with respect to each other that the impulse shaft of either stabilizing gyro is parallel to the direction of acceleration forces to which its associated integrator or the oscillatable body therein responds. The relative position of the integrators is also determined by the fact that the lines tangent to the circles described by the oscillatable bodies through the points of intersection of the oscillation circles with the radii corresponding to the center positions of the oscillatable bodies are at right angles to each other, no matter whether the oscillatable bodies have vertical or horizontal axes of oscillation. If, as in the example described, the axes of oscillation are maintained in a vertical position, not only said tangents but also said radii will be at right angles to each other.

From the foregoing it is apparent that the impulse axes of the compass gyro 46, of the azimuth gyro 50 and of the stabilizing gyro 40 as well as the direction of the accelerations to which integrator 53 responds, are normally parallel with each other and directed north-south. For this reason, stabilizing gyro 40 and integrator 53 are designated as the north-south stabilizing gyro and as the north-south integrator respectively. In an analogous manner, stabilizing gyro 41 and integrator 54 which operate in a direction at right angles to the first-mentioned direction, are denoted as the east-west stabilizing gyro and as the east-west integrator respectively.

The means for controlling corrections in consideration of the true rotation of the earth are not necessarily mounted on the stabilized platform, and will, therefore, be described in another connection.

In order to eliminate the effects of bearing friction, there are provided on the platform 37 two shaking devices 55 and 56 the axes of which are at 90° to each other. The shaking devices which will be described in detail below, are connected with the platform and mounted thereon so that they will act upon the platform directly. The shaft of the shaking device 55 is parallel to the impulse shaft 44 of the stabilizing gyro 40 and the shaft of the shaking device 56 is parallel to the impulse shaft 45 of the stabilizing gyro 41. A third shaking device 57, 58 (see Fig. 20) consists of two parts one of which is arranged on the upper end of shaft 36 and the other on the lower end. These parts are covered by the protective hoods 264 and 265 which are fastened to Cardan ring 33 in a suitable manner, as for example, by screws 266 and 267 respectively. Instead of providing shaking devices such as 55 and 56 on the platform, shaking devices of the type shown in connection with shaft 36 may be mounted on the shafts 34 and 35. On shaft 34, slip rings 60 are fastened of which but a few are indicated and whose function it is to tap current from the various electric conductors indicated in Figs. 1 and 23-28. Corresponding slip ring leads (not shown in the drawings) are provided on the other shafts also for the purpose of passing the current from ring 32 via ring 33 to platform 37. As these devices are well known and not mentioned in the claims, they are omitted from the drawings for sake of clearness.

The various instruments which are mounted on the platform will now be described in detail.

Since stabilizing gyros 40 and 41 are alike so far as their main parts are concerned, a description of the east-west gyro 41 illustrated in Fig. 4 will be sufficient for the understanding of their structure. Gyro 41 is designed as a so-called float gyro in order to diminish the friction. There is no reason, however, why a gyro of some other well-known type might not be applied successfully. An external case 61 rigidly fixed to platform 37 is filled with a liquid 62 on which a float 63 is carried. The float has a vertical shaft with axis 43 which simultaneously is the precession axis of the gyro contained in the float. 64 is the gyro body with impulse shaft 45. The gyro box 65 is rigidly connected with float 63 by means of bracket 66. On the top of float box 61 a junction box 68 is arranged into which the upper end 69 of the float shaft protrudes, and which is rigidly connected with the said float box by brackets 67. The shaft is journalled at its upper and lower ends in bearings 70 and 71 respectively.

Means are provided for compensating the influence of the rotation of the earth on the stabilizing gyros 40 and 41, special means being available at the east-west gyro to compensate for both the true and the apparent rotation of the earth. The north-south gyro 40 is only provided with means for compensating the apparent rotation of the earth. The said compensating means are housed in junction box 68; they are shown upon a large scale in Figs. 5 and 6 with respect to the above-mentioned east-west gyro 41, and in Figs. 7 and 8 as regards the north-south gyro 40.

As stated above, the extension 69 of precession axis 43 protrudes into junction box 68 (Figs. 5 and 6). Said axis or spindle carries on its end a rigidly connected yoke-shaped piece 72, the arms 73 and 74 of which can be seen in Fig. 6 where the middle portion is not shown. Each of the arms 73 and 74 has at its end a freely rotating pulley 75 and 76 respectively.

In addition the box 68 contains two synchronous receivers 77 and 78 one arranged higher than the other; receiver 77 acts upon a shaft 79 and receiver 78 on a shaft 80. Shafts 79 and 80 are arranged between brackets 103 and 104 fixed on box 68, and the receiver 77 is fitted to the bracket 105. The axes of shafts 79 and 80 are at right angles to the zero position of the yoke-shaped piece 72 which position is determined by the direction of arms 73 and 74 when the gyro 41 is not precessing. Moreover, the two sectors 81 and 82 which are capable of oscillating about shafts 85 and 86 are pivoted to the case 68 at 83 and 84 respectively. The sectors carry, on shafts 87 and 88, the rotatable levers 91 and 92 which are balanced by weights 89 and 90. The ends of the levers carry pulleys 93 and 94 which are connected by suitable driving means, such as cords 95 and 96 with the pulleys 75 and 76 respectively. Spiral springs 97 and 98 arranged on the shafts 87 and 88 as well as on levers 91 and 92 serve to maintain the cord drives under a definite tension. Each of the receiver shafts 79 and 80 carries a worm 99 and 100 respectively which mesh with corresponding worm teeth 101 and 102 respectively on the segments 81 and 82. The receiver 77 may be adjusted by a transmitter 460 (see Figs. 21, 23, 25) in proportion to the ground speed component, in the manner described below, the said component being parallel to the impulse shaft 45 of gyro 41. The said receiver serves to compensate for the influence produced by the apparent rotation of the earth due to the ground speed of the craft.

A transmitter 300 (see Figs. 12, 13, 23, 27) may act upon the receiver 78. The said receiver serves for compensating the influence produced by the true rotation of the earth upon the east-west gyro 41. Transmitter 300 may be operated to act upon receiver 78 in proportion to the cosine of the geographical latitude as will be described below.

As mentioned above, the north-south stabilizing gyro 40 requires only a device for compensating the apparent rotation of the earth. The parts serving this purpose are the same as those used for gyro 41 and are represented in Figs. 7 and 8 and have the same reference numerals, except for the addition of a prime, as the corresponding parts illustrated in Figs. 5 and 6. It should be noted that the free arm 74' of the yoke-shaped piece 72' may serve to balance the mass of arm 73'. Receiver 77' is set by transmitter 457 (see Figs. 21, 23, 25) in proportion to the speed component which lies parallel to the impulse shaft 44 of gyro 40.

The compass gyro 46 with north-south impulse shaft 49 is shown in Fig. 9. This gyro may be of any suitable type. In order, however, to reduce the friction to a minimum, it is preferable to employ a gyro of the float type. For this purpose, a case 106 filled with a liquid and provided with a float 109 is secured to platform 37 by suitable means, such as screws 108.

Float 109 is journaled in an upper bearing 110 and a lower bearing 111 in case 106. It can swing about a vertical shaft 47, and within its interior, supports a frame 112. Frame 112 has a horizontal axis which lies above the impulse shaft 49 of the gyro, and is defined by journals 113 and 114 with the result that frame 112 may oscillate in float 109. Shaft 47 is rigidly connected with float 109. Journals 113 and 114 are likewise rigidly secured to frame 112, and are connected with shaking devices 143 and 144 which will be described below. Gyro box 115 has a vertical shaft 116, 117 offset laterally by a predetermined amount in relation to shaft 47 and to impulse shaft 49. Shaft 116, 117 is journaled in frame 112 at points 118 and 119 in such a manner that the center of gravity of the whole system lies in a plane containing the axis of shaft 47 when the gyro is not precessing. The oscillations which gyro box 115 can perform about the axis of shaft 116, 117 act upon a spring 120 fastened to the gyro box 115 and the frame 112. This arrangement has been chosen in order to cause the gyro to precess, under the action of horizontal accelerations, in a plane having a definite inclination to the horizon, rather than in a horizontal plane.

A contact arm 121 is connected to journal 114 of frame 112 so as to swing together therewith and to slide over a contact segment 122 fixed to float body 109. Segment 122 carries a contact 123 so arranged, as shown in Fig. 10, that arm 12. engages contact 123 only when frame 112 is in its center position, that is to say when the axes of shafts 47 and 116, 117 are parallel with each other. The switch formed by parts 121 and 123 is connected in series with another switching device one element of which, that is to say a contact arm 124, is carried by the upper end of the vertical float shaft 47. Contact arm 124 is capable of sliding over contacts 126 and 127 which are fixed on the case (see Figs. 10a). The said contacts are provided on either side of the center position of contact arm 124, and a current supply is interrupted by an insulating piece 128 when the contact arm is in its center or neutral position. Since the two contact devices 121 and 123 as well as 126 and 127 are connected in series (see Fig. 23), current can flow only when the contact arm 121 is in its center position and at the same time arm 124 is off its center or neutral position.

As shown in the drawings, contact arm 124 is not directly connected to shaft 47 but arranged on a yoke-shaped piece 673 which, in turn, is fixed on shaft 47. The yoke-shaped piece 673 is part of a device intended to compensate the apparent earth rotation, as described above and illustrated in Figs. 7 and 8. There is no need, therefore, of giving a description of the individual parts which co-operate here with receiver 677 in place of receiver 77' (Figs. 7 and 8) of the north-south stabilizing gyro 40. The said compensating device is housed in case 668 supported by brackets 667 on case 106. At the bottom of box 668, there are arranged the contacts 126, 127 and the insulating piece 128, and in the cover of the box an opening 669, preferably of circular form, is provided for a purpose to be referred to below. The receiver 677 is controlled by the same transmitter 457 that is also employed to actuate the receiver 77'.

Means are provided to brake the rotation of the float 109 about the axis of shaft 47. For this purpose, the aforementioned yoke-shaped piece 673 has an extension 129 with an arm 130 pointing upwards. The said arm projects through the said opening 669 in box 668 and with its end extends into a hole 131 of a copper disc 132 which has a vertical rotatable shaft 133 connected to it. Said shaft is journaled, as described below, in the shaking devices 134 and 135 which are attached to the bracket 136 connected with the case 106. The copper disc is part of an eddy-current brake, the brake magnet 137 of which as well as the coil or winding 138 are also supported by bracket 136. A horizontally swinging body 139 is arranged coaxially with the copper disc 132, the mass of said swinging body being on that side of shaft 116, 117, which is opposite to the side on which the mass of the gyro body 140 with gyro box 115 is situated. The horizontally swinging body 139 is provided with an arm arranged on the opposite side of its axis of oscillation by which it is resiliently coupled over spring 142 with copper disc 132. The said spring should be given a small initial tension. Body 139 may be mounted so as to rotate freely on shaft 133 of copper disc 132.

Fig. 11 shows the azimuth gyro 50 with its precession axis 51 and impulse shaft 52. The azimuth gyro, in its case 145, is mounted to rotate in a frame connected with platform 37, say by screws 168, and may carry, in a case 146 arranged on frame 169, a device to balance the influence of the true rotation of the earth, similar to the one contained in the case 68 of the stabilizing gyro 41 (Figs. 5 and 6). The azimuth gyro 50, however, has no device to balance the apparent rotation of the earth. Receiver 78' of the azimuth gyro (see Fig. 23) which corresponds to receiver 78 of the stabilizing gyro 41 in Fig. 6, is set by a transmitter 301 which may be turned by hand simultaneously with transmitter 300. The adjustment of receiver 78', effected by transmitter 301, is not proportional to the cosine but to the sine of the geographical latitude. The device employed to bring about this proportionality will be described below.

In another case 147 attached to support 169 a moment generator is provided which is constructed on the principle of a well-known Desprez instrument and consists of a moving coil which rotates in a field produced by direct current. A moment generator of this kind will be described below together with the integrator 53.

The integrators 53 and 54 mounted on platform 37 are fully identical in structure. Each integrator comprises an oscillatable mass 148 and 149 respectively with a vertical axis of oscillation 148a and 149a respectively, so arranged as to respond to horizontal accelerations in predetermined directions at right angles to each other. As stated above, integrator 53 is associated with stabilizing gyro 40, and integrator 54 is associated with stabilizing gyro 41, the connecting lines between 148 and 148a and between 149 and 149a (see Fig. 2) being at right angles to the gyro shafts 44 and 45 respectively. A detailed description will now be given in connection with integrator 53 (see Fig. 14).

Integrator 53 comprises a circular casing 152 with a cover plate 153, an oscillatable mass 148 being attached to the casing. The two parts 152 and 153 are connected to each other by screws 154, and the casing is closed so as to reduce to a minimum the air friction of parts rotating therein. The casing is provided with a lower shaft 155, and the cover plate with an upper shaft 156. The shafts 155 and 156 are journaled in a U-shaped support 157. An inertia mass 159 with a shaft 150 is pivoted in casing 152 and its cover 153, so as to rotate freely therein. Shaft 150, arranged coaxially with shafts 155 and 156, carries an armature 160, and casing 152 contains an associated field 161. Said armature and field constitute a synchronous receiver. On either side of the casing, means are provided on shafts 155 and 156 for neutralizing the effects of bearing friction. These means consist of shaking devices 162 and 163, and comprise short-circuit armatures 164 and 165 respectively mounted on shafts 155, 156 and twin-coil alternating fields 166 and 167 attached to support 157. Shaking is effected by commutating the alternating fields in cadence, the commutators being displaced with respect to each other, and commutation is effected by means of commutating devices actuated by an electric motor 304 shown in Figs. 17 and 24, and described below.

Means are provided for directly or indirectly supplying the aforementioned receiver 160, 161 with current in dependence upon the oscillations of mass 148 in response to accelerations occurring in the direction to which the integrator is assigned. These means consist of a contact device at the upper end of shaft 156 having a contact arm 170 with contact bead 171, which moves over a contact segment 172 with graduation 173 (see Fig. 23), when case 152 oscillates. The said contact segment 172 is arranged on a shaft 175 of a double-coil armature 176, which, together with a two-coil field 177 forms a moment generator. The said shaft 175 is mounted on part 174 of support 157, and field 177 is rigidly attached thereto. On shaft 175, furthermore, a copper disc 178 of an eddy-current brake is fastened. The magnets 179 and the coil 180 of the brake are mounted on support 174. Segment 172 is also provided with a so-called zero spring 182, which acts upon an arm 181 rigidly connected to the support 157, and tends to maintain segment 172 as well as the parts connected thereto in a definite zero position. Contact bead 171 controls not only the supply of current to receiver 160, 161, but also the energization of the moment generator 176, 177. The complete device 170—182 serves to produce a damping effect upon the current regulation of receiver 160, 161. Contact arm 170 with contact segment 172 are clearly shown in Fig. 23.

It should be noted that the current feeding parts are not shown in Fig. 14, in order to keep the drawing as simple and clear as possible. Current-conveying parts may be of any well-known or approved kind, and are indicated, for example, in Fig. 3 as slip rings 60.

The corresponding parts of the integrator 54 so far as they are referred to below, have been given the reference numbers 150' to 182'. The moment generator at the azimuth gyro 50, referred to in an earlier part of this description, is similar in construction to the one described above, and its parts, so far as they are mentioned, have been given the reference numbers 176'' and 177''.

It has been stated that the instruments so far described, require certain corrections in order to safeguard proper stabilization and directing of the platform. It is necessary to feed receiver 77' of stabilizing gyro 40 and receiver 677 of compass gyro 46 with current in dependence upon the craft's speed component in north-south direction, and to feed receiver 77 of stabilizing gyro 41 in dependence upon the speed component in east-west direction. This may be done by hand if means are available to read the speed with which armatures 160 of the integrators 53 and 54 rotate. It is preferable, however, to place all indicating instruments and all apparatus requiring manipulation outside the platform, in order to guard against any tampering or accidental disturbances. For this purpose there is provided a motor-transmitter set 302, 303 for integrator 53, and a like set 306, 305 for integrator 54, outside the platform at any suitable place as shown in Fig. 15. Motor 302 is coupled with transmitter 303, and motor 306 with transmitter 305. The motor currents are controlled by the contact devices 170—173 of integrator 53, and 170'—173' of integrator 54 respectively in dependence upon the deflections of the integrator casings due to accelerations. The transmitters 303 and 305 are electrically connected to the receivers 160, 161 and 160', 161' respectively of the integrators. In this manner, all the said motors, transmitters and receivers rotate in proportion to that component of the craft's speed to which the corresponding integrator is assigned. This has been explained at length in the above-mentioned parent application. By connecting to the motors indicating instruments responsive to the motor revolutions, the speed can be ascertained either directly or indirectly. Thus, the revolution counters 350, 351 attached as in Fig. 15 to the motors 302 and 306 respectively permit the finding of the speed through division of their readings by the time elapsed between two readings, multiplied by a constant. It will be obvious that instead of, or in addition to, the counters other instruments such as tachometers may be used. The employment of counters is preferable, however, because they give readings which are valuable in other respects. The result found in this manner is a measure for the current to be applied for exciting the above mentioned receivers 77', 677 and 77 of the respective gyros.

However, controlling of these receivers by hand would be cumbersome, and mistakes may frequently occur. For this reason it is preferable to provide, also outside the platform, a mechanical means which permits a constant and automatic control of these receivers in dependence upon the speed components. A device complying with the requirements in this respect is illustrated in Figs. 21 and 22.

In a case 400 a continuously rotating electric motor 401 is mounted, having a vertical shaft 402 which drives a friction plate 405 through toothed gears 403 and 404. Above friction plate 405 is arranged a spindle 406 operated by a receiver 407. Receiver 407 is actuated by the same transmitter 303 which actuates receiver 160, 161 of integrator 53 mounted on the platform 37. On the said spindle 406, a bevel-friction differential gear 408 with a spider 409 is arranged which also carries nut 410 for spindle 406 and a pair of epicyclic gears 411. The gears 411 mesh with bevel gears 412 and 413, the hubs of which form friction wheels 414 and 415 respectively which operate in contact with the friction plate 405. Gears 412 and 413 are mounted on the nut 410 so as to rotate freely. The friction wheels are embraced by a double arm 416 in which the gears and wheels rotate freely while being held against axial movement so that arm 416 in the case of a displacement of nut 410 is moved lengthwise of the spindle. Spindle 406 is mounted on two brackets 420 and 421 which are secured to the bottom of the case 400 by screws 422 or the like. In the same brackets 420 and 421 are arranged cross arms 423, 424 rigidly connected with the end of the double arm 416 and capable of sliding at 425 and 426.

A device of like construction, with friction plate 427 likewise actuated by motor 401 through pinion 403, spindle 428 and bevel-friction differential gear 429, is arranged at right angles to the aforementioned device. Spindle 428 is operated by receiver 453 which is actuated by transmitter 305 of the second integrator 54. The double arm 430 operates in connection with the differential gear 429, and cross arms 432 and 433 are guided in the brackets 445, 446. A rack bar 454 is connected with the cross arms 423, 424, of the double arm 416. A pinion 455 mounted on the armature shaft 456 of a transmitter 457 meshes with the rack 454 and is driven thereby to actuate said transmitter whenever the arm 416 is moved laterally. Transmitter 457 acts upon receivers 77' (Figs. 8, 23, 25) and 677 (Fig. 9) and communicates the corrections for the apparent rotation of the earth to the north-south stabilizing gyro 40 and to the compass gyro. Correspondingly, a rack 458 is also provided on the cross arms 432, 433 of the double arm 430, which acts on a transmitter 460 through a pinion 459 (Fig. 25). Transmitter 460 operates the corresponding receiver 77 (Figs. 6, 23) of the other stabilizing gyro 41 to make corrections for the apparent rotation of the earth in the east-west direction.

Likewise means are provided for facilitating the setting of receivers 78 at the east-west stabilizing gyro, and of receivers 78' at the azimuth gyro in order to make corrections for the effect of the true rotation of the earth, that is to say in proportion to the cosine of the latitude at the stabilizing gyro 41 and in proportion to the sine of the latitude at the azimuth gyro 50. As the alteration of the true earth rotation is generally very slow, it is sufficient to make corrections only at rather long intervals. For this reason, it is preferred to employ a semi-automatic device in which the latitude may be manually set whereupon the actuation of receivers 78 and 78' occurs automatically at the required rate.

For this purpose there are provided two transmitters 300 and 301, which are shown in Figs. 12 and 13, to actuate receivers 78 and 78' respectively. The transmitters are housed in a case formed by a base-plate 310 and a cover 311 which are connected by screws 312 inserted from below. The two transmitters 300 and 301 are mounted on base-plate 310 in such a manner that their armature shafts 313 and 314 respectively are at right angles to each other, shaft 314, however, lying above shaft 313. For this purpose the transmitter 301 is not fixed to the base-plate 310 directly but on a mounting 315 belonging to same. Two pairs of guide bars 316, 317, and 318, 319 are suitably arranged on the inside of the cover 311, parallel to shafts 313 and 314, in such a manner, however, that bars 316, 317 are situated above bars 318, 319. Each pair of bars serves to guide an H-shaped slide 320 and 321 respectively. Slide 321 carries on the lower side of its flange 325, situated next to the transmitter 300, a rack 327 fixed to the said flange by screws 326. Arranged on shaft 313 of the transmitter 300, a pinion 328 meshes with the said rack. In the same manner slide 320 is provided on its flange 329 with a rack 330 in mesh with a pinion 331 which is rigidly mounted on shaft 314 of transmitter 301. At the top of cover 311 a bearing 332 is provided the axis of which is vertical and intersects the axes of the shafts 313 and 314. In bearing 332, a shaft 333 is arranged which carries a hand wheel 334 at the top and a crank arm 335 at the bottom. At the other end of the said crank arm is mounted a pin 336 the diameter of which equals the width of slots 322 and 323, and which projects into the two slots. A pointer 337 connected with the hand wheel 334 can be caused to move over a graduation 338 which is fastened to the cover 311 or engraved therein in such a manner that the zero line is parallel to the shaft of transmitter 300. If the hand wheel 334 is turned through a desired angle, adjustable by means of pointer 337 and graduation 338, rack 327 is shifted in proportion to the sine, and rack 330 in proportion to the cosine of such angle, and the pinions 328 and 331 cause the transmitters 300 and 301 respectively to rotate correspondingly and to actuate their associated receivers 78 and 78'.

Mention has been made hereinabove of devices employed to compensate the effect produced by the bearing friction of the platform.

Fig. 16 shows one of the shaking devices 55 and 56 which are of like construction and are mounted on the platform proper. The shafts of the shaking devices are arranged at right angles to each other. The following description refers to the shaking device 55. A flywheel 184 is mounted in supports 183 on platform 37 and is connected to the latter by means of a light zero spring 185 through arm 186. The shaft 187 of the flywheel is intentionally subjected to a certain amount of friction in its bearings in the supports 183. The ends of the said shaft carry armatures 188 and 189 lying in the alternating fields 190 and 191 respectively. The armatures and fields may suitably be designed as the well-known phase shifters with symmetrically displaced short-circuit windings, and are surrounded by the cases 192 and 193 respectively. Fig. 24 shows the circuit of the field windings. The corresponding parts of the shaking device 56 are numbered 183' to 193'.

The shaking devices 134 and 135, referred to in describing Fig. 9, which are arranged on shaft 133, are constructed in a manner similar to those shown in Fig. 16 so that the parts numbered 134 and 135 correspond to the cases 192 and 193 with the phase shifters housed inside these cases. The connection of the field windings may be the same in all the shaking devices. Another type of connection may, however, also be used in which, as illustrated in Fig. 24 in connection with the shaking devices 134, 135, not two but three coils 194, 195, 196 are Y-connected. Depending on which of the two connections is used, certain means have to be employed for controlling the exciting current of the field coils.

The means necessary for controlling the alternating fields, e. g., 190, 191 (Fig. 16), belonging to a set of shaking devices with twin-coil field winding, are illustrated in Figs. 17 and 18. Such means consist essentially of a motor 304 with a device for periodically changing the position of the switching elements. Motor 304 is mounted on or outside platform 37 at any point of the craft, and the switching elements may be connected via collector rings 60 with the shaking devices of the platform instruments. For this purpose, armature shaft 197 of the motor is equipped with two contact arms 198, 199 arranged side by side on one and the same radius; the said contact arms are jointly fed by way of a collector ring 200 with stationary brush 201. The contact arms 198 and 199 differ in length and move opposite two contact half-rings 203 and 204 offset essentially through 180 degrees and each exceeding the length of a semi-circle; the said contact half-rings are mounted on a frame 202 or the like. The contact half-rings 203 and 204 overlap by as much as is required to set up the alternating field. This is illustrated by the magnetization curves shown in Fig. 19. The contact half-ring 203 is electrically connected with field coil 191 and the contact half-ring 204 with field coil 190. With the motor 304 caused to rotate continuously, the contact device 198 to 204 effects a periodically alternating excitation of the shaking devices. As stated above, shaft 187 of flywheel 184 (Fig. 16) is intentionally subjected to a certain amount of friction in its bearings provided in supports 183. This friction serves to generate at the reversing points of the shaking movement a definite and permanently alternating moment which likewise alternates periodically but is displaced in phase by 90 degrees as compared with the moment produced by the alternating fields.

The fields of the shaking devices 134, 135 and 143, 144 are represented in Fig. 24 as rotating fields, i. e., as three-phase alternating fields, since two-phase and three-phase fields can be used with equal success for shaking devices of this kind. The device for controlling these three-phase alternating fields will be understood from Figs. 17, 18b and 24. It is shown on the left end of shaft 197 of motor 304. The fixed contact half-rings 205, 206 are arranged in a manner similar to the half-rings 203 and 204. Four contact arms 207, 208 and 207', 208' insulated from each other, are mounted on shaft 197, all of them being arranged on the same diameter. Contact arms 207 and 207' are capable of sliding along half-ring 205, and contact arms 208, 208' along half-ring 206. The current is fed to each contact arm 207, 208, 207', 208' by a separate slip ring 209, 210, 209', and 210' respectively with brush 211 and 212 respectively. The connection of contact arms and half-rings with the field coils of the phase shifters will be dealt with below in connection with Fig. 24.

Attention is called to the fact that all shaking devices of all parts or instruments require only one common controlling device provided the field windings are of like type. Thus, the shaking devices 55, 56 on platform 37, furthermore, the shaking devices 162 and 163 on the integrator 53 as well as the shaking devices 162', 163' on integrator 54 may all be controlled by the arrangement 198—204, and likewise the shaking devices 134, 135 and 143, 144 on the compass gyro may all be controlled by the arrangement 205—212. These two controlling devices may, however, also be driven by one and the same motor 304 as shown in the illustration.

In the shaking devices dealt with so far, only the shafts of the inertia masses or the parts mounted on these shafts are shaken. In the shaking device 57, 58 (see also Figs. 2 and 24) described below and illustrated in Fig. 20 not only the shaft is shaken but also the two bearings in which the shaft is journaled. This shaking device is preferably employed in conjunction with the bearings of the platform 37 on the gimbal rings 32 and 33. The two parts of the shaking device, belonging to the same shaft, are preferably displaced in phase. Owing to this phase displacement, there is obtained, at the reversing points of the movement of one of the parts of the shaking device, a torque resulting from the movement of the other shaking device.

Platform 37 illustrated in Fig. 20, with its mounting 38, is supported by the vertical shaft 36. Shaft 36 is so arranged in gimbal ring 33 as to rotate freely. For this purpose the said shaft is provided with an upper ball bearing 213, the outer ball race 214 of which is arranged in a hub piece 215 capable of rotating with the bearing surface 216 in the gimbal ring 33. A cover ring 218 rigidly connected with the hub piece 215 by screws 217, protects both the ball bearing 213 and the hub piece 215, from axial displacement with respect to the gimbal ring 33. In a similar manner the lower end of shaft 36 has a ball bearing 219 with an external ball race 220 which is arranged in a bushing 222 provided with a flange 221. The inner ball race 223 of the ball bearing 219 is supported with an intermediate ring 224, on a spherical thrust bearing 225 which bears on the bottom 226 of bushing 222. Ball bearings 219 and 225 are secured by a nut 227 screwed into bushing 222. Bushing 222 is capable of rotating, with its bearing surface 228, in the gimbal ring 33 and is held against axial displacement by flange 221 as well as by a hub 230 connected with the said bushing screws 229.

The upper extension 231 of shaft 36 carries the armature 232 for rotating field 233 which is attached to the gimbal ring 33 by means of the holding piece 234. The external circumference of the above mentioned hub piece 215 is provided with gear teeth 235 in mesh with a toothed wheel 236 which, in turn, is mounted on shaft 237 of a friction reverse gear. The said gear has a center coupling piece 238 which, together with two armature discs 239 and 240 is mounted on shaft 237; shaft 237 is capable of moving to and fro in the direction of its axis, due to the pot-shaped magnets 241, 242. Thereby the coupling piece having jaws 243, 244 on either side, is enabled to mesh alternately with jaws 245 and 246 respectively of the bevel gears 247, 248 so as to reverse the direction of rotation of the shaft. The bevel gears 247 and 248 are mounted, for this purpose, in parts 249, 250 of a support 251 fixed on gimbal ring 33 and on shaft 237; the said bevel gears mesh with a bevel gear 252 which is mounted on a shaft 253 of a continuously rotating electric motor 254 supported by gimbal ring 33. The motor shaft 253 also carries contact arms 255, 256, 257 of which arm 255 serves to commutate the current fed to the pot-shaped magnets 241, 242 and the arms 256, 257 for commutating the rotating field 233. The latter commutation may be displaced in phase relatively to that of the pot-shaped magnets 241, 242. Current is fed to the contact arms 255, 256, 257 by way of the associated collector rings with brushes 255a, 256a, 257a. The arc-shaped counter contacts 258, 259, 260 and 261 respectively are fixed on support 251 by a frame 262 and can be seen in Fig. 24.

The hub 230 at the bottom end of the shaft 36 is provided with gear teeth 263 on its circumference. These teeth mesh with a device similar to the gear teeth 235 at the other end of the shaft 36. As far as these parts are shown in Figs. 20 and 24, they are given the corresponding reference numbers 236'—262'; in connection with parts 236'—262', however, there is no device for commutation corresponding to arms 256 and 257 and counter contacts 260 and 261 respectively, since, in this case, a shaking device corresponding to the above device 232, 233 is dispensed with. Caps 264 and 265 cover the parts projecting from the gimbal ring 33 and are fixed on same by screws 266 and 267.

It is desirable to have the pot magnets 241, 242 reversed with a certain time lag as compared with the reversing of the corresponding magnets 241', 242'. The said time lag occurs practically automatically since motors 254, 254' will never operate with the same R. P. M., i. e., arms 255, and 255' will practically always make contact at different times. If, however, all four magnets happen to be controlled by one and the same motor 254, which certainly may be the case, it is best to arrange the necessary contact arms 255 and 255' at a definite angle to each other.

In the description now to be given the electrical connections are set forth in accordance with Figs. 1 and 23–28. Parts of groups A and B (A representing the gyroscopes arranged on platform 37 and B the shaking devices) are more or less connected with each other as may be derived from the above description; thus, for example, the shaking devices 134, 135 and 143, 144 belonging to group B are incorporated in the gyro (according to Fig. 9) of group A. For simplicity's sake, however, and to render the circuit diagrams as clear as possible, only the parts of group A are indicated in the diagram Fig. 23, and only the parts belonging to group B are indicated in the diagram Fig. 24.

In Fig. 23, a three-wire system 3∼ for three-phase current, a two-wire system= for direct current, and a two-wire system ∼ for single-phase alternating current are connected up through slip rings 60 arranged on the left-hand side. These conductors are distributed over the slip rings and branched off into the single conductors R, S, T for three-phase current, + and − for direct current, and r, s for single-phase current. On the right-hand side connecting leads $a$, $b$, $c$, $d$, $e$ are run to groups C, D, E, F, the individual conductors being connected to the slip rings 60 and separately numbered for each cable. Thus, as will be seen from the diagram, the cable $a$ is composed of 6 individual conductors each of which is clearly marked by one of the designations $a1$, $a2$, $a3$, $a4$, $a5$, $a6$.

The conductors $a5$ and $a6$ are directly connected with the direct current conductors + and − respectively, and the conductors $b1$ and $b2$ supply the direct current to group C, as shown in Fig. 1. In a similar manner the conductors $c7$, $d7$, and $e7$ constitute extensions of the single-phase conductor $s$, and conductors $c8$, $d8$ and $e8$ constitute extensions of the other single-phase conductor $r$.

The dash lines enclose all those parts that belong to each individual apparatus. The fields thus obtained are given the same reference numbers as are applied to these apparatus in the foregoing description, viz:

40 for the north-south gyro (Figs. 4, 7, 8)
41 for the east-west gyro (Figs. 4, 5, 6)
46 for the compass gyro (Figs. 9, 10, 10a)
50 for the azimuth gyro (Fig. 11)
53 for the north-south integrator (Fig. 14)
54 for the east-west integrator (Fig. 14)

As mentioned above, the gyros 40, 41, 46 and 50 are suitably constructed as synchronous motors and as such generally equipped with a short-circuited armature and a three-phase field 500, 501, 502, and 503 respectively, in star connection. the three field coils are thus connected with each other at one end of each, the other ends being connected in the case of all four gyros to the conductors R, S, T. The fields 504, 505, 506 of the receivers 77', 77, 78 connected with the gyros 40 and 41 are joined to the single-phase conductors $r$ and $s$. 77' and 77 serve for making corrections in accordance with the apparent rotation of the earth, and 78 in accordance with the true earth rotation. The armature windings 507, 508 of the receiver 77' and 77 respectively are connected with the transmitters 457 and 460 respectively of group C (see Figs. 22 and 25) by way of the conductors $c1$, $c2$, $c3$ and $c4$, $c5$, $c6$ respectively, the armature windings 509 of receiver 78 being connected to the transmitter 300 of group F (see Figs. 12, 13, 27) via conductors $e1$, $e2$, $e3$. The receiver 78' of the azimuth gyro 50 and receiver 677 of the compass gyro 46 are wired in a similar manner. The fields 510 and 610 are fed through the two single-phase conductors $r$ and $s$, and the armature windings 511 are connected through conductors $e4$, $e5$, $e6$ with the transmitter 301 of group F, the armature windings 618 being connected in parallel to the armature windings 507 of the receiver 77' and joined to the transmitter 457 of group C through conductors $c1$, $c2$, $c3$.

The two field coils 177'' of the moment generator at the azimuth gyro are connected in series and joined to the direct current conductors +, −. One end of each of the armature coils 176'' is connected to the conductor, the two other ends being connected with the contacts 126 and 127 respectively of the contact making devices provided at the compass gyro 46. The associated contact arm 124 is connected to the contact surface 123 of the other contact-making device and finally the contact arm 121 is joined to the + conductor.

As may be seen in the diagram, current flows through one of the coils 176'' only when the contact arm 121 is in the center position and the contact arm 124 is outside this position. As the two coils 176'' are wound in opposition, the armature equipped with coils 176'' rotates in one direction or the other, depending on whether the contact arm is on contact 126 or 127. The current and hence, the magnitude of the torque increases the further the arm 124 moves out of its centre position, decreasing the active resistances 512, 513 between the individual contacts 126 and 127 respectively.

The field 138 of the eddy-current brake of the compass gyro 46 is connected with its two ends to the direct current conductors +, —.

The fields 161 and 161' connected with the cases of the integrators 53 and 54 are fed through the conductors $r, s$ carrying single-phase current. The associated armature coils 160 of the integrator 53, which are correlated to the inertia masses, are connected with the conductors $d1$, $d2$, $d3$ leading to transmitter 303 (Figs. 15 and 26) of group E, and armature coils 160' of integrator 54 are connected with the armature coils of the transmitter 305 through conductors $d4$, $d5$, $d6$ in a similar manner.

The moment generators of the integrators, which are constructed on lines similar to the above mentioned moment generator of the azimuth gyro, are connected with the conductors +, — of the direct current system through their twin-coil fields 177 and 177' respectively. The associated armatures 176 and 176' carry two coils, both coils of each armature being connected with one another at one end of each and, at the same time, to the minus conductor of the direct current supply. The open coil ends of armature 176 of the integrator 53 are connected through conductors $a1$, $a2$ with the field coils of the electric motor 302 (Figs. 15 and 26) and, in parallel to same, joined to the external subdivisions 173 of the contact segment 172. Resistances 514 are inserted between the individual contact subdivisions 173. Contact arm 170 opens contact 173, when in its center position. The said contact arm is connected to the + conductor for direct current. The moment generator 176', 177', together with contact segment 172' and contact arm 170' is connected in a similar manner, the only difference being that the open ends of the armature coils 176' are passed to the field coils of the electric motor 306 through conductors $a3$, $a4$.

The windings 180, 180' of the eddy-current brakes are connected to the direct current +, — conductors.

Fig. 26 shows a wiring diagram of all shaking devices, i. e., all those parts belonging to group B. Inside quadrangle 37, the parts belonging to a particular instrument are enclosed by a dotted line, the fields thus obtained being marked with the reference number of the corresponding instrument. Thus, the quadrangle 37 corresponding to the platform contains a dash lined field 53 in which are to be found the shaking device on the integrator 53 according to Fig. 14, a field 55 for the special shaking device 55 according to Figs. 2 and 16, a field 56 for the special shaking device according to Figs. 2 and 16, and finally a field 46 for the shaking devices of the compass gyro 46 according to Fig. 9.

Above quadrangle 37 for the platform, a rectangle 57 is shown in Fig. 24, and below the quadrangle 37 a rectangle 58 on the left side. These contain the circuits for the shaking devices 57 and 58 respectively which in Figs. 3 and 20 are indicated as being arranged on the gimbal ring 33 of platform 37. The field in the bottom right-hand corner having the reference number 515 contains the circuit connections for the control of all shaking devices illustrated in Figs. 17, 18a and 18b.

Fig. 24 shows only the wires necessary to elucidate the circuit connections of the shaking devices. A large number of the slip rings 60 in this figure are, therefore, not connected since they are only of importance with respect to group A according to Fig. 23. The shaking devices 55, 56 as well as those of the integrators 53 and 54 are provided with two twin-coil alternating fields with a short-circuited armature rotating in same. Considering that all these shaking devices are connected in a similar manner, it will be sufficient to explain the circuit with reference to the shaking devices 162, 163 of integrator 53. As may be seen from the diagram, the coils 166 and 167 are connected in series and one end of each of a pair of coils 166 and 167 are interconnected. At their junction point 516 the coils 166 and 167 are connected to the conductor $s$ of the single-phase supply. The open end of the coils 166 is connected with the contact half-ring 203 of the controlling device 515 and the open end of the coils 167 is joined to the contact half-ring 204 of the same controlling device.

Thus, the open ends of the coils 191 of the shaking device 55, coils 191' of the shaking device 56, as well as coils 166' of the shaking device of integrator 54 are connected with the half-ring 203, and the open coil ends 190, 190' and 167' with the contact half ring 204. The contact arms 198 and 199 actuated by motor 304 are connected with conductor $r$ of the single-phase supply. As may be understood from the diagram, motor 304 is wired as a direct current shunt wound machine and is thus connected to the two direct current conductors +, —. It now becomes evident that, with motor 304 rotating the contact arms 198 and 199, an alternating current will flow through coils 166, 166', 191 and 191', as long as the contact arm 198 is on the contact half-ring 203; it is, furthermore, evident that, in a similar manner, coils 167, 167', 190 and 190' will carry current as long as the contact arm 199 slides along the contact half-ring 204. Thus, constantly alternating torques are set up by the shaking devices 162, 163 on the shafts 155, 156 of integrator 53 (Fig. 14). In a similar manner shafts 155', 156' of integrator 54 as well as the inertia masses 184 or 184' on the shaking devices 55 or 56 receive constantly alternating torques.

As stated above, three-phase fields, as indicated in connection with the compass gyro, may also be used in place of twin-coil alternating fields for the shaking devices. The compass gyro 46 has two pairs of shaking devices 134, 135 and 143, 144. The armatures 517, 518, 519 and 520 of the said shaking devices are constructed as short-circuit armatures similar to those previously mentioned, the fields being designed as star-connected three-phase fields.

The three coils of the rotating field associated with the shaking device 134 are numbered 194, 195, 196. Correspondingly, the shaking device 135 has the rotating field 194', 195', 196', the fields 521, 522, 523 and 521', 522', 523' respectively belonging to the shaking devices 143, 144. To control these rotating fields the control device shown in Figs. 17 and 18b is provided, in which the electric motor 304 turns contact arms 207, 207', 208, 208' so that these are capable of sliding along the contact half-rings 205 and 206 respectively. The circuit connections are such that the contact half-ring 205 is connected to the conductor S and half-ring 206 to a second conductor T of the three-phase-current supply 3∼. The open ends of the coils 196' and 521' are joined to the contact arm 207. Contact arm 207' is similarly connected to the open ends of the coils 195 and 523, contact arm 208 to coils 196 and 522, and contact arm 208' to the coils 195' and 522'. The four other coils viz. 194, 194', 521 and 523' are all connected to the third conductor R of the three-phase supply 3∼. It is evident that, for example, in the case of contact arm 207 being on contact half-ring 205 and contact arm 208' on half-ring 206, with the other contact arms out of contact with the half-rings, the coils of the shaking devices 135 and 144 will carry current since coils 194' and 523' are connected to the three-phase conductor R directly, whereas coils 195' and 522' are joined to the three-phase conductor T via contact arm 208' and contact half-ring 206, and coils 196' and 521' to the three-phase conductor S through contact arm 207 and contact half-ring 205. If the contact arms move in such a manner that the contact arm 207' slides over the contact half-ring 205 and contact arm 208 along the half-ring 206, the rotating fields of the shaking devices 134 and 143 are connected in a similar manner with the three-phase conductors R, S, T.

The shaking devices 57 and 58 (Figs. 2 and 20) connected with shaft 36 of platform 37, are provided with the shunt-wound motors 254 and 254' respectively, and correspondingly connected to the +, − conductors of the direct current supply. Motor 254 actuates a contact arm 255 capable of sliding along the contact half-rings 258, 259 and serving to control the windings 524 and 525 of the pot-shaped magnets 241 and 242 respectively. The coils 524 and 525 are connected with one end of each point 526. This junction 526 is connected with the − conductor. The open end of coil 524 is connected with the contact half-ring 259, and the open end of coil 525 with the contact half-ring 258. Thus, when the contact arm 255 is being turned by motor 254, and slides over the contact half-ring 259, current is fed from the + conductor through contact arm 255, contact half-ring 259 and coil 524 to the − conductor. When contact arm 255 reaches the contact half-ring 258, coil 525 is correspondingly excited, and, thereby, the coupling piece 238 (Fig. 20) caused to move to and fro. In a similar manner the motor 254' drives contact arm 255' which is capable of sliding along the contact half-rings 258' and 259'. The magnet coils 524', 525' of the pot-shaped magnets 241', 242' are connected with the controlling device in the same way as the windings 524 and 525.

In addition, motor 254 actuates the contact arms 256, 257 which are arranged diametrically opposite each other and are capable of sliding on the contact half-rings 260, 261 for the field 233 within which the short-circuit armature 232 is capable of moving. The rotating field is built up by the coils 527, 528 and 529.

The coils are star-connected, and the open ends of coils 527 and 528 are connected to the contact arms 256 and 257 respectively, the open end of coil 529 being joined to the R conductor of the three-phase supply 3∼. The contact half-ring 260 is connected with the three-phase conductor S, and contact half-ring 261 with the three-phase conductor T. It is evident that a reversal of the phases takes place when the contact arms 256 and 257 pass from one contact half-ring to the other (260 and 261 respectively) in rotating.

Hence, a torque changing in direction is set up on the armature 232 and accordingly also on shaft 231 (see Fig. 20).

Fig. 28 shows the connection of the parts belonging to group C, i. e., the electrical connections of the contrivances belonging to the apparatus shown in Figs. 21, 22 for controlling the corrections in accordance with the apparent rotation of the earth. Cable bundles b and c of group A (Fig. 23) are connected with this apparatus. On the other hand, the two cable groups g and f are branched off this apparatus. The cable groups g and f are so arranged with their individual conductors that g1 and f1, g2 and f2 ... g6 and f6 are interconnected. Cable bundle g runs to group D and bundle f to group E.

As described above, the electrical contrivances of the apparatus belonging to group C consist of a motor 401 connected as shunt-wound motor and joined to the two conductors b1 and b2 which, as shown in Fig. 23, constitute the + and the − conductor respectively of the direct current supply. There are, furthermore, the two transmitters 457 and 460 as well as the two receivers 407 and 453. As will be seen from Fig. 21, receiver 407 is operatively connected to transmitter 457, and receiver 453 to transmitter 460. The field coils 530, 531, 532, 533 of the respective receivers 407, 453 and transmitters 457, 460 are connected to the conductors c7 and c8 which are identical with the single-phase alternating current conductors r, s (see Fig. 23). The armature coils 534 of receiver 453 are connected with the armature coils 537 of transmitters 305 (Fig. 26) of group E by way of the conductors f1, f2, f3. The armature coils 535 of the receiver 407 are connected in a similar manner through conductors f4, f5, f6 with the armature coils 536 of transmitter 303. Single-phase current is fed to the field coil 538 of the transmitter 303 as well as to the field coil 539 of the transmitter 305 (Fig. 26) through conductors d7, d8. The armature coils 540 (Fig. 25) of the transmitter 457 are connected through conductors c1, c2, c3 with the armature 507 of the receiver 77' at the north-south gyro 40, and the armature coils 541 of the transmitter 460 through conductors c4, c5, c6 with the armature coils 508 of the receiver 77 at the east-west gyro 41 (see Fig. 23). Cable bundle g may be used for connecting, in parallel to receivers 407 and 453, an additional instrument constituting group D in which receivers 473, 474 actuated by transmitters 303 and 305 may be used for indicating navigational factors such as location, distance travelled, speed or course of the craft.

Hence, it is evident that the receivers 407 and 453 operate as soon as the transmitters 303 and 305 begin to work. Since, however, the receivers 407 and 453, as already stated, are operatively connected to the transmitters 457 and 460 respectively, these transmitters will also be actuated so that they can operate the receivers 77', 677 and 77 respectively.

As may be seen from Fig. 15, the transmitters 303 and 305 are driven by two electric motors 302 and 306 respectively. The said motors (see Fig. 26) are shunt-wound motors the armatures 550 and 551 of which are fed with direct current through conductors a5 and a6. Motor 302 has two field coils 542, 543 wound in opposition, and motor 306 has two field coils 544 and 545 likewise wound in opposition. One end of each of the field coils 542, 543, 544, 545 is connected to the negative direct current conductor through a6. The other end of the coil 542 is joined to the other side of the contacts 173 on the contact segment 172 through a1, the other end of coil 543 being connected via a2 to the other side of the contacts 173 (see Fig. 23). A corresponding connection is provided between the open ends of coils 544 and 545 through conductors a3 and a4, and the two contact sides of the contact segment 172'. It is thus evident that the electric motors 302 and 306 are dependent on the deflections of the contact arms 170 and 170' respectively, with respect to the magnitude of their torque as well as their sense of rotation, or, in other words, the motors 302 and 306 are controlled by the integrators 53 and 54 respectively.

The transmitters 300 and 301 of group F are likewise transmitters of the usual type. Single-phase current is conveyed to their field coils 546 and 547 through conductors e7, e8. The armature coils 548 of transmitter 300 are connected through the conductors e1, e2, e3 with the armature coils 509 of the receiver 78 at the east-west gyro, the armature coils 549 of the transmitter 301 being joined to the armature coils 511 of receiver 78' at the azimuth gyro, through conductors e4, e5, e6.

The operation of the device described above is as follows:

The leads RST (Fig. 23) of the platform 37 are connected with the three-phase supply, and the direct current conductors + and − with the direct current supply, the single-phase conductors r and s being joined to the single-phase alternating current supply. The field coils 500, 501, 502, 503 of the two stabilizing gyros 40, 41, of the compass gyro 46, and of the azimuth gyro 50 are fed from these sources; the said coils are connected to the above mentioned conductors R, S, T. As soon as the gyros reach their proper speed of revolution, they either move the platform 37 into the correct position or maintain it in this position. As the gyro 46 is constructed as a compass gyro and suspended in the manner described, it tends, as is well known, to adjust itself with the impulse shaft to the meridian so that this shaft indicates the north-south direction at all points of the globe with the exception of a certain region near the north pole and a further region close to the south pole.

The compass gyro 46 (Fig. 9) is a so-called inactive gyro which tends to find its most suitable position in space without itself turning the platform into a definite direction by means of some kind of moment set up on its bearings. If, however, the gyro shaft 49 happens to be in a position other than the zero position, relative to the platform 37 or to the case connected with same, i. e., if that diameter of the platform which is supposed to have a north-south direction, is not parallel to the impulse shaft 49 of the compass gyro, then the contact arm 124 will have passed over to one of the contacts 126 and 127. Current thus flows from the direct current conductor + through contact arm 121, contact 123, contact arm 124, contact 126 or 127 to one of the armature coils 176" of the moment generator in the case 147 of the azimuth gyro 50 (Fig. 11) and thence back to the direct current conductor −. Since the field windings 177" of the moment generator are excited as soon as the current source is connected to the + and − conductors of the platform, a torque is set up which tends to tilt gyro 50 about shaft 51. To a moment of this kind the gyro responds with a precession on a vertical axis thereby producing a torque of the platform about its shaft 36 since its support 169 is rigidly connected with platform 37. This continues to be the case till contact arm 124 is restored to the position 128 having no counter contact, i. e., until the platform itself has taken up the north-south direction, or, in other words, till the shaft 44 of the stabilizing gyro 40 runs parallel to the shaft 49 of the compass gyro.

If the platform 37 is not clearly in a north-south direction when the gyros begin to work, it is gradually adjusted to the said direction accordingly as the compass gyro 46 takes up the north-south direction with its shaft 49. Since the compass gyro, oscillating at first about the north-south direction, is known to take quite a time before it adjusts itself definitely to this direction, the platform 37, in order to reduce the required time, may be set by hand to the north-south direction at least approximately, by a previous comparison with any other compass. It then only remains for the compass gyro to effect an accurate adjustment and to keep the platform in the north-south direction. Any oscillations of the gyro about shaft 47 are damped by the eddy current brake whose coil 138 is supplied with current through the direct current conductors + and −.

As the gyro body 140 of the compass gyro 46, in order to be able to operate as such, must be arranged to oscillate about a horizontal shaft 113, 114, an oscillation of this shaft would take place whenever a horizontal acceleration occurs not exactly in the direction of the said shaft. The gyro would respond thereto by precessing about shaft 47 with the undesirable result that shaft 49 would leave the north-south direction and control the azimuth gyro 50 by operating the contacts 124, 126 and 127 respectively, and thereby also move the platform 37 out of the north-south direction. This is prevented by an interruption of the control circuit +, 121, 123, 124, 126 and 127, 176" − respectively, that is to say, by contact arm 121 leaving the counter contact 123 as soon as the gyro frame 112 is displaced from its vertical position. Although the platform is hereby prevented from being displaced from its correct position in response to horizontal accelerations, the oscillating motion of the gyro might produce a disturbing effect. Such motion is damped, however, by the action of the eddy current brake 132, 138 upon the precession axis 47. This eddy current damping alone would only be capable of reducing the time the gyro requires to be restored to its normal position once it has begun its oscillating motion. The intention, however, is to cause the gyro not to make any, or only inconsiderable, oscillating movements in response to horizontal accelerations, or, in other words, the force producing the oscillation is to be counter-acted immediately by a force capable of wholly or at least partly compensating the effect of such oscillation-producing force immediately the gyro begins to swing to and fro.

As described above, it is for this purpose that the gyro box 115 in frame 112 is arranged eccentrically with the shaft 116, 117, and that the counterweight 139 with the necessary parts is provided. Thus, if, for example, the gyro frame 112 oscillates backwards and at right angles to the plane of the drawing when acted upon by a horizontal acceleration, then the gyro box 115 will oscillate about shaft 116, 117, and will be displaced from the plane of frame 112 in a likewise backward direction. This gives rise to a precession tending to prevent the gyro frame from deflecting when the gyro body 140 (in Fig. 9) rotates counterclockwise. At the same time the counterweight 139 tends to swing backwards and thereby to turn disc 132 together with arms 130 and 129 and shaft 47 through spring 142 in clockwise direction, seen from above, i. e., opposite to the direction in which the precession tends to take place under the influence of the oscillating gyro frame.

Hence, it is evident that by a correct dimensioning of the masses, lengths of the lever arms, etc. the oscillating motion under the action of horizontal accelerations of the whole system can be compensated entirely or at least to a very considerable degree. Due, however, to springs 120 and 142 as well as to the low position of the centre of gravity of the gyro, all parts are restored to their initial positions from which they may have been displaced.

As described above, the compass gyro is fitted with a device for compensating the apparent rotation of the earth. This apparent rotation results from the fact that the craft equipped with an apparatus embodying the present invention moves over the surface of the earth which latter thus appears to be rotating backwards below the craft. The apparent rotation of the earth may be regarded as having two components, one of north-south direction and one of east-west direction. The east-west component of the apparent rotation of the earth does not cause a deviation of the compass gyro from the north-south direction since this component is either added to, or subtracted from, the true rotation of the earth depending upon the course direction. The north-south component of the apparent rotation of the earth, however, causes such a moment on the compass gyro that the latter tends, under the influence of this moment, to position itself transverse to the north-south direction (parallel to the axis of the north-south component of the apparent rotation of the earth). Therefore, it is necessary to compensate at the compass gyro the moment originating from the north-south component of the apparent rotation of the earth in order to cause the compass gyro to keep its north-south direction.

The correction is controlled by transmitter 457 (see Fig. 21) which, as described above, is rotated in accordance with the east-west component of the said motion. The motion of the transmitter 457 is also transmitted through conductors c1, c2, c3 (Fig. 23) to receiver 677 which thereby rotates worm 699 and correspondingly also sector 681. In the normal position, i. e., with the gyro not precessing, the direction of the thread drive 695 is parallel to that of lever 673. If, however, sector 681 takes up a different position due to the action of receiver 677, lever 691 and the thread drive 695 will likewise take up a different direction and exert a definite torque on shaft 47 through lever 673, as long as the sector 681 is off its centre position. Thus, depending on the sense of this torque, the precession moment of the compass gyro 46 about shaft 47 for correcting the apparent rotation of the earth, will either increase or decrease. The device, therefore operates in the same manner as the corresponding device on the north-south stabilizing gyro 40, as will be described below.

It has been explained above how the compass gyro 46 acts upon the azimuth gyro 50 with the aid of the contact devices 121—127 so that the platform 37 is maintained in the north-south direction by the said azimuth gyro. As this influence is due to electric current impulses, there may be a certain risk that the azimuth gyro will begin to oscillate on account of frequently repeated impulses at the moment generator 176", 177", and that the platform thus will fail to maintain its correct position.

A considerable percentage of the relative motion of the compass gyro to the platform, which causes these current pulses, results from the influence exerted by the earth's true rotation. It will be readily understood that such influence is proportional to the sine of the geographical latitude of the particular place at which the craft equipped with the apparatus of the present invention happens to be at any particular moment. Since the impulse shaft of the compass gyro, on the one hand, and thus also the azimuth gyro is intended always to be parallel to the meridian, and since on the other hand the meridians at the equator are parallel to each other, the true earth rotation will not exert any influence on a craft proceeding along the equator. The higher, however, the geographical latitude of the parallel of the earth on which the craft is proceeding, the more do the meridians converge. Hence, the influence of the true rotation of the earth is bound to increase towards the poles, and due to the spherical shape of the earth this increase takes place in accordance with the sine law.

With the aid of the contrivance accommodated in the case 146 of the azimuth gyro (see Fig. 11) the influence of the true earth rotation, instead of making itself felt by repeated current pulses, can be made to produce a more or less permanent torque. As stated above, the said device corresponds to those parts in Figs. 5 and 6 which operate in conjunction with receiver 78. The corresponding parts of the azimuth gyro are marked with the same reference numerals as in Figs. 5 and 6 with the addition of a prime.

If the azimuth gyro happens to be in such a position that its impulse shaft 52 is in the correct position, i. e., directed north-south without a precession taking place, the lever arm 74' which is fixed to shaft 51 (see Fig. 11) and the lever 92' will be in such a position that the tension of the thread drive 96' does not exert any torque on shaft 51. In other words, the lever arm 74' and the line connecting the centers of rollers 76' and 94' are parallel to each other. The receiver 78', as already described, is controlled by transmitter 301 which may be adjusted by means of the device shown in Figs. 12 and 13. Turning of the handwheel 334 to such an extent that the pointer 337 will register with that mark on scale 338 which corresponds to the geographical latitude of the craft, will cause the transmitter 301 to be actuated in proportion to the sine of the latitude. Simultaneously receiver 78' is operated and, in turn, actuates sector 82' with equal proportionality through a worm 100'. Consequently the thread drive 96' leaves its original position and takes up an inclined position to lever 74' thus producing a torque on shaft 51 of the azimuth gyro. The said gyro responds to this torque by a supporting moment in the bearings of its shaft 52 and thereby rotates the platform continuously so that the north-south direction is maintained.

It is, of course, possible to make the actuation of transmitter 301, i. e., its adjustment, dependent on the operation of any other part of the device which is itself affected by the north-south component of the motion of the craft. Thus it would be possible, say, to have shaft 333 (of the device illustrated in Figs. 12, 13) rotated by transmitter 457.

In the system illustrated in Figs. 12 and 13 the adjustment of the transmitter is effected by hand, first, because the use of the apparatus for actuating the two transmitters according to the sine, or the cosine, of the geographical latitude would be highly complicated and, further, because the variation of the influence of the earth's true rotation takes place so slowly in general that an occasional manual adjustment of the apparatus will suffice to obtain the necessary accuracy.

The effect produced by the two stabilizing gyros 40 and 41 has been dealt with in the course of the foregoing description. Both gyros are provided with horizontal impulse shafts which, however, are arranged at right angles to each other. These gyros are likewise constructed similar to the azimuth gyro as working gyros. They counteract any tilting motion of the platform in the following manner: If, for example, the platform tilts about the north-south axis, the gyro 41 precesses with the east-west impulse shaft 45 about its shaft 43, thereby simultaneously producing a supporting moment in the bearings of the impulse shaft 45, which tends to keep the platform in a horizontal position.

In exactly the same way the stabilizing gyro 40 would produce a supporting moment for the platform due to its precession, the very moment the platform 37 tends to tilt about an east-west axis.

Both gyros receive certain corrections, the north-south gyro 40 a correction for compensating the apparent rotation of the earth and the east-west gyro 41 a correction for compensating the influence of both the true and the apparent earth rotation.

The correction required for compensating the influence of the apparent rotation of the earth cannot be dispensed with, simply because in the absence of such correction the gyros would tend to remain with their impulse shafts in a horizontal plane of the starting point. The corrections are required in order to maintain the platform 37 horizontal in relation to the point over which the craft is passing at the moment, and that even with progressive motion of the craft fitted with the apparatus described; or expressed in other words, the corrections are required in order to maintain the platform always in a position at right angles to the earth's radius passing through the craft at any given moment.

The device for compensating the apparent earth rotation is illustrated in Figs. 7 and 8 with reference to the north-south gyro, and in Figs. 5 and 6 with respect to the east-west gyro, and has been described above. Since the action of the individual parts is analogous to that of the corresponding parts at the compass gyro 46 and the azimuth gyro 50, there is no need to deal again with these devices in detail. It should be noted, however, that the receivers 77 and 77' are actuated by the transmitters 460 and 457 of the device illustrated in Figs. 21 and 22. By the illustrated device transmitter 457 is shifted from its original position in accordance with the speed prevailing in the north-south direction, and the transmitter 460 according to the speed prevailing in the east-west direction; the displacement is such that either transmitter operates its associated receiver correspondingly.

The compensation of the influence of the true rotation of the earth exerted upon the east-west gyro 41 has also been referred to in detail in connection with the azimuth gyro 50. Whereas in the case of the azimuth gyro, however, the impulse shaft lies in the north-south direction and the compensation has to be effected by transmitter 301 according to the sine of the latitude, the compensation in the case of the stabilizing gyro 41 with east-west impulse shaft obviously has to be effected according to the cosine of the latitude. The said compensation is obtained with the aid of the apparatus illustrated in Figs. 12 and 13.

Thus, with the aid of the above-described devices it is possible to maintain the platform 37 permanently horizontal and, at the same time, in a definite direction. The errors possibly resulting from bearing friction are eliminated to a very high degree by the shaking devices above described. As these shaking devices only serve to bring about constantly changing bearing movements, which has been clearly explained in the course of the description, there is no need to give again a detailed account of the operation of these devices.

As stated above, the integrators 53 and 54 serve in connection with the present invention for establishing the speed of the craft in north-south and in east-west direction as a measure for the corrections to be made at the stabilizing gyros and at the compass gyro in order to eliminate incorrect operation due to the apparent rotation of the earth. In the embodiment illustrated each of said integrators is connected with a motor-transmitter set 302, 303 and 306, 305 respectively and with a revolution counter, from the indications of which the speed components may be ascertained by reckoning. In order to provide an automatic means for continuously making corrections at the mentioned gyros, transmitters 303 and 305 are connected for synchronous operation with receivers 407 and 453 respectively which in conjunction with motor 401 drive transmitters 457 and 460 to actuate the correcting receivers 77', 677 and 77 at the respective gyros.

An integrator of the type herein described by way of example is claimed in the above-mentioned application Serial No. 705,997, and has been disclosed therein and explained in detail as to structure, principle and operation. As the particular integrators are not claimed in the present application, a short description of their operation supplementing the foregoing description of its structure will suffice for an explanation of their effect on the stabilizing of the platform.

When the craft equipped with the apparatus of the present invention is subjected to an acceleration, the north-south component of the said acceleration results in a deflection of the oscillatable mass 148 of integrator 53 (Fig. 14) either in a clockwise or an anticlockwise direction, when seen from above. The case 152, 153 and the shaft 156 both participate in this motion. Consequently, the contact arm 170 moves out to one of the left or right contacts 173 (see Fig. 23), and thus excites the corresponding field coil 542 or 543 of motor 302 (Figs. 26 and 15) which is thereby caused to rotate. As motor 302 is coupled to transmitter 303, the latter also begins to operate and supplies the armature coil 160 of the receiver at the integrator with current. Since the associated field 161 is permanently connected with the live conductors $\sim r$ and $s$, a torque is set up which causes the armature to rotate in one direction or the other, depending on the position of the contact arm 170. The reaction moment of the field 161 connected with mass 148 corresponds to this torque, so that said mass will share the tendency of the field to rotate in a direction opposite to the armature. The sense of rotation of motor 302 depends on whether contact 170 is on contacts at the left or right hand side of sector 172, and the sense of revolution of armature 160 depends on the sense of rotation of motor 302. The eddy current brake 178—180 and the moment generator 176, 177 described above, serve to damp any abrupt reversal from one direction of rotation to the other.

It will be evident that by correctly dimensioning the coils of both armature and field 160 and 161 respectively as well as the resistances 514 in the current supply circuit of motor 302, the result can be obtained that, at any given moment, the reaction moment of the field will be just as large as, and opposite in direction to, the moment produced by the acceleration and acting upon mass 148. Hence, on the one hand, the deflection of mass 148 will be neutralized and on the other hand an accelerating force will be exerted upon armature 160, this accelerating force being proportional to that acting upon mass 148 at that particular time. Since, however, the exciting current impulses are proportional to the acceleration of the system in the north-south direction at any given moment, due to the momentary position of the contact arm 170 and the resistances 514, the time integral of the current impulses corresponds to the time integral of all these accelerations, and both motor 302 and armature 160 must always rotate with a speed proportional to the speed of the craft equipped with the apparatus of the present invention. Consequently, the number of the revolutions made by motor 302 is bound to be proportional to the distance traversed by the craft in a north-south direction. The corresponding revolution counter 350 may, therefore, be calibrated directly in miles and indicate the distance covered in the north-south direction. The speed may then be ascertained either by reckoning or by means of a suitable additional indicating instrument. Integrator 54 operates in an analogous manner with respect to the east-west direction.

As stated above, receivers 407 and 453 are connected to transmitters 303 and 305 respectively, and thus also rotate with speeds proportional to the components of the ground speed of the craft. Consequently, the arrangement of the integrators and accessory parts is adapted to furnish the required corrections at the stabilizing gyros and at the compass gyro to eliminate the effects of the apparent rotation of the earth. The interrelation of the various instruments is clearly set forth in Fig. 28 illustrating diagrammatically the main electric and mechanical connections of the mechanisms.

Although only one embodiment of the invention has been illustrated and described, many modifications and alterations within the scope of the invention will be obvious to persons skilled in the art. It will therefore be understood that the invention is not restricted to structure and arrangement of parts and to particular types of instruments such as the integrators and gyro devices described herein, but what is claimed as the invention of the said Johann Maria Boykow, is:

1. A device for stabilizing and orienting apparatus mounted on such device comprising a platform, swingable about three axes at right angles to each other, a compass gyro, two stabilizing gyros for stabilizing said platform about two axes at an angle to each other, an azimuth gyro for maintaining said platform in a definite azimuthal direction, said four gyros being mounted on said platform, said azimuth gyro being under the control of said compass gyro so as to precess in response to deviations of said compass gyro from its normal position, whereby said platform will be turned into said definite azimuthal position, said stabilizing gyros and said compass gyro having normally vertical axes of precession, and means in connection with said stabilizing gyros and said compass gyro and responsive to alterations of the speed of a craft equipped with said device for setting up torques about said precession axes of said stabilizing gyros and said compass gyro so as to counteract disturbing influences of the apparent rotation of the earth.

2. A device for stabilizing and orienting apparatus mounted on such device comprising a platform, swingable about three axes at right angles to each other, a compass gyro, two stabilizing gyros for stabilizing said platform about two axes at an angle to each other, an azimuth gyro for maintaining said platform in a definite azimuthal direction, said four gyros being mounted on said platform, said azimuth gyro being under the control of said compass gyro so as to precess in response to deviations of said compass gyro from its normal position, whereby said platform will be turned into said definite azimuthal position, said stabilizing gyros and said compass gyro having normally vertical axes of precession and said azimuth gyro having a normally horizontal axis of precession, means in connection with said stabilizing gyros and said compass gyro and responsive to alterations of the speed of a craft equipped with said device for setting up torques about said precession axes of said stabilizing gyros and said compass gyro so as to counteract disturbing influences of the apparent rotation of the earth, and other means in connection with said azimuth gyro and at least one of said stabilizing gyros and adjustable in dependence on the geographic latitude for setting up torques about said precession axes of said azimuth gyro and at least one stabilizing gyro so as to counteract disturbing influences of the true rotation of the earth.

3. A device for stabilizing and orienting apparatus mounted on such device comprising a platform, swingable about three axes at right angles to each other and including a shaft at right angles to the platform surface, a compass gyro, two stabilizing gyros for stabilizing said platform about two axes at an angle to each other, an azimuth gyro for maintaining said platform in a definite azimuthal direction, said four gyros being mounted on said platform, said azimuth gyro being under the control of said compass gyro so as to precess in response to deviations of said compass gyro from its normal position whereby said platform will be turned into said definite azimuthal position, said stabilizing gyros and said compass gyro having normally vertical axes of precession, means in connection with said stabilizing gyros and said compass gyro and responsive to alterations of the speed of a craft equipped with said device for setting up torques about said precession axes of said stabilizing gyros and said compass gyro so as to counteract disturbing influences of the apparent rotation of the earth, and three shaking devices, two of which being mounted on said platform, and the third one being connected to said shaft, said shaking devices being so arranged and constructed as to shake said platform in relation to the three axes about which said platform is swingable.

4. A device as claimed in claim 3 in which each of said shaking devices mounted on said platform comprises a flywheel resiliently restricted to said platform, electric phase shifters connected to said flywheel, an electric motor, and switching elements in operative connection with said motor and electrically connected to said phase shifters, said switching elements being so constructed and arranged as to create constantly alternating torques by said phase shifters when said motor rotates and said switching elements carry an electric current.

5. A device as claimed in claim 3 in which said shaking device connected with said shaft comprises a rotatable bearing for said shaft, means for turning said bearing, means for periodically alternating the direction of rotation of said bearing at short intervals, and a phase shifter attached to said shaft.

6. A device for stabilizing and orienting apparatus mounted on such device, comprising a platform swingable about three axes at right angles to each other, two stabilizing gyros and a compass gyro each having a normally vertical axis of precession, an azimuth gyro, said compass gyro, said azimuth gyro and one of said stabilizing gyros having impule axes normally in north-south direction, and said other stabilizing gyro having an impulse axis normally in east-west direction, said gyros being mounted on said platform so as to maintain it in a horizontal position and a definite direction, and moment generators mounted on the vertical precession axes of said stabilizing gyros and of said compass gyro, each of said moment generators being adapted to set up torques about the precession axis of the pertaining gyro, and means for actuating said moment generators in proportion to the ground speed components in east-west and north-south direction respectively of a craft provided with the device so as to counteract influences of the apparent rotation of the earth.

7. A device for stabilizing and orienting apparatus mounted on such device, comprising a platform swingable about three axes at right angles to each other, two stabilizing gyros each having a normally vertical axis of precession, a compass gyro, an azimuth gyro, said compass gyro, said azimuth gyro and one of said stabilizing gyros having impulse axes normally in north-south direction, and said other stabilizing gyro having an impulse axis normally in east-west direction, said gyros being mounted on said platform so as to maintain it in a horizontal position and a definite direction, moment generators at the precession axes of said stabilizing gyro with east-west directed impulse axis and at said azimuth gyro, each of said moment generators being adapted to set up torques about the precession axis of the pertaining gyro, and means for actuating the moment generator of said stabilizing gyro with east-west directed impulse axes in dependence on the cosine of the geographical latitude, and for controlling the moment generator of said azimuth gyro in dependence on the sine of the geographical latitude so as to counteract influences of the true rotation of the earth.

8. A device for stabilizing and orienting apparatus mounted on such device, comprising a platform swingable about three axes at right angles to each other, two stabilizing gyros each having a normally vertical axis of precession, a compass gyro with a normally vertical axis of precession, an azimuth gyro with a horizontal axis of precession, said gyros being mounted in said platform so as to maintain it in a horizontal position and a definite direction, said compass gyro, said azimuth gyro and one of said stabilizing gyros having impulse axes normally in north-south direction, and said other stabilizing gyro having an impulse axis normally in east-west direction, torque generators in connection with the vertical axes of said stabilizing gyros and of said compass gyro, means for actuating said torque generators in proportion to the ground speed components in east-west and north-south directions respectively of a craft provided with the device so as to counteract influences of the apparent relation of the earth, moment generators in connection with the precession axes of said stabilizing gyro with east-west directed impulse axis and of said azimuth gyro, each of said moment generators being adapted to set up torques about the precession axis of the pertaining gyro, and means for actuating the moment generator of said stabilizing gyro with east-west directed impulse axis in dependence on the cosine of the geographical latitude, and for controlling the moment generator of said azimuth gyro in dependence on the sine of the geographical latitude so as to counteract influences of the true rotation of the earth.

9. A device as claimed in claim 7 in which said moment generators comprise receivers, and said actuating means comprises two slides arranged at right angles to each other and having slotted cross arms, a manually operatable crank including a crank pin which engages the slots of said cross arms, two transmitters adapted to excite said receivers, and driving connections between each of said slides and the respective transmitter.

10. A device as claimed in claim 7 in which said moment generators comprise receivers, and the actuating means comprises two slides arranged at right angles to each other and having slotted cross arms, a manually operatable crank including a crank pin which engages the slots of said cross arms, two rack bars fixed to the slides respectively, two transmitters each including a shaft and a pinion thereon, each pinion being in mesh with one of the rack bars respectively, said transmitters being adapted to excite said receivers, and indicating means connected with said crank and provided with a scale graduation.

11. A device for stabilizing and orienting apparatus mounted on such device, comprising a platform swingable about three axes at right angles to each other, two stabilizing gyros for stabilizing the platform in a horizontal plane, a compass gyro, an azimuth gyro for maintaining the platform in a definite direction, two integrators, said four gyros and said two integrators being mounted on said platform, means controlled by said compass gyro for setting up precessional torques in said azimuth gyro, in response to deviations of the compass gyro from its normal position to turn said platform into said definite direction and means controlled by said integrators for setting up precessional torques in said stabilizing gyros and said compass gyro so as to counteract the influences of the apparent rotation of the earth.

12. A device for stabilizing and orienting apparatus mounted on such device, comprising a platform swingable about three axes at right angles to each other, gyroscopic means for stabilizing said platform about two horizontal axes at an angle to each other, other gyroscopic means for maintaining a horizontal axis of said platform in a definite direction, two integrators responsive to accelerations of a craft, equipped with said device, in two different horizontal directions, each of said integrators including a member rotating with a speed proportional to the craft's speed in the direction of the accelerations to which the respective integrator responds, means in operative connection with said rotating members for indicating functions of the speed of said rotating members, correcting means for setting up precessional torques in said gyroscopic means so as to counteract the influences of the apparent rotation of the earth, and means operatively connected to said indicating means for actuating said correcting means according to the speed which corresponds to the indications of said indicating means.

13. A device for stabilizing and orienting apparatus mounted on such device, comprising a platform swingable about three axes at right angles to each other, gyroscopic means for stabilizing said platform about two horizontal axes at an angle to each other, other gyroscopic means for maintaining a horizontal axis of said platform in a definite direction, two integrators responsive to accelerations of a craft, equipped with said device, in two different horizontal directions, each of said integrators including a member rotating with a speed proportional to the craft's speed in the direction of the accelerations to which the respective integrator responds, means in operative connection with said rotating members for setting up precessional torques in said gyroscopic means in dependence on the speed of said rotating members, so as to counteract influences of the apparent rotation of the earth, and other means for setting up precessional torques in said gyroscopic means in dependence of the geographic latitude for correcting the influences of the true rotation of the earth.

14. A device for stabilizing and orienting apparatus mounted on such device, comprising a platform swingable about three axes at right angles to each other, gyroscopic means for stabilizing said platform about two horizontal axes at an angle to each other, other gyroscopic means for maintaining a horizontal axis of said platform in a definite direction, two integrators responsive to accelerations of a craft, equipped with said device, in two different horizontal directions, each of said integrators including a member rotating with a speed proportional to the craft's speed in the direction of the accelerations to which the respective integrator responds, said gyroscopic means and said integrators being mounted on said platform, a first motor-driven transmitter associated with each integrator and controlled thereby so as to rotate with a speed proportional to the speed of the rotating member of the respective integrator, a second transmitter coordinated to each integrator, means in operative connection with said first and said second transmitter to drive the latter in response to speed alterations of said first transmitter, and receiving means actuated by said second transmitter for setting up precessional torques in said gyroscopic means in dependence of said speed alterations so as to correct influences of the apparent rotation of the earth at said gyroscopic means.

15. A device for stabilizing and orienting apparatus mounted on such device, comprising a platform swingable about three axes at right angles to each other, two stabilizing gyros for stabilizing the platform in a horizontal plane, a compass gyro, an azimuth gyro for maintaining the platform in a definite direction, two integrators, said four gyros and said two integrators being mounted on said platform, means responsive to deviations of said compass gyro from its normal position for setting up precessional torques in said azimuth gyro so as to return said platform to said definite position, means controlled by said integrators for setting up precessional torques in said stabilizing gyros and said compass gyro to counteract the influences of the apparent rotation of the earth, and means for correcting the influence of the true rotation of the earth at said azimuth gyro and at least at one of said stabilizing gyros.

16. A device for stabilizing and orienting apparatus mounted on such device, comprising a platform swingable about three axes at right angles to each other, two stabilizing gyros for stabilizing the platform in a horizontal plane, a compass gyro, an azimuth gyro for maintaining the platform in a definite direction, two integrators responsive to accelerations of a craft, equipped with said device, in two different horizontal directions, each of said integrators comprising a member rotating with a speed proportional to the craft's speed in the direction to which the respective integrator responds, said four gyros and said two integrators being mounted on said platform, means responsive to deviations of said compass gyro from its normal position for setting up precessional torques in said azimuth gyro so as to return said platform to said definite position, a first motor-driven transmitter associated with each integrator and controlled thereby so as to rotate with a speed proportional to the speed of the respective member of the respective integrator, a second transmitter coordinated to each integrator, means in operative connection with said first and said second transmitter to drive the latter in response to speed alterations of said first transmitter, receiving means at said stabilizing gyros and at said compass gyro, said receiving means being controlled by said second transmitters and being adapted to set up precessional torque in said stabilizing gyros and said compass gyro so as to correct influences of the apparent rotation of the earth, and means for correcting the influence of the true rotation of the earth at said azimuth gyro and at least at one of said stabilizing gyros.

17. A device for stabilizing and orienting apparatus mounted on such device, comprising a platform swingable about three axes at right angles to each other, two stabilizing gyros for stabilizing said platform in a horizontal plane, each stabilizing gyro having a normally vertical axis of precession, a compass gyro, an azimuth gyro for maintaining said platform in a definite direction, said compass gyro, said azimuth gyro and one of said stabilizing gyros having impulse axes normally in north-south direction, and said other stabilizing gyro having an impulse axis normally in east-west direction, two integrators, one of said integrators being responsive to accelerations of a craft, equipped with said device in north-south direction and the other integrator being responsive to accelerations in east-west direction, each of said integrators comprising a member rotating with a speed proportional to the craft's speed in the direction to which the respective integrator responds, means controlled by said compass gyro for setting up precessional torques in said azimuth gyro in response to deviations of said compass gyro from its normal position to turn said platform into said definite direction, means controlled by said north-south responsive integrator for setting up precessional torques in said stabilizing gyro with north-south directed impulse axis, and means controlled by said east-west responsive integrator for setting up precessional torques in said stabilizing gyro with east-west directed impulse axis to counteract influences of the apparent rotation of the earth.

18. A device for stabilizing and orienting apparatus mounted on such device, comprising a platform swingable about three axes at right angles to each other, two stabilizing gyros for stabilizing said platform in a horizontal plane, each stabilizing gyro having a normally vertical axis of precession, a compass gyro, an azimuth gyro for maintaining said platform in a definite direction, said compass gyro, said azimuth gyro and one of said stabilizing gyros having impulse axes normally in north-south direction, and said other stabilizing gyro having an impulse axis normally in east-west direction, two integrators, one of said integrators being responsive to accelerations of a craft, equipped with said device, in north-south direction and the other integrator being responsive to accelerations in east-west direction, means controlled by said compass gyro for setting up precessional torques in said azimuth gyro for turning said platform into said definite position, means controlled by said north-south responsive integrator for setting up precessional torques in said stabilizing gyro with north-south directed impulse axis according to the craft's speed in the north-south direction, means controlled by said east-west responsive integrator for setting up precessional torques in said stabilizing gyro with east-west directed impulse axis according to the craft's speed in east-west direction so as to counteract influences of the apparent rotation of the earth, means at said stabilizing gyro with east-west directed impulse axis for applying corrective precessional torques in proportion to the cosine of the geographical latitude, and means at said azimuth gyro for applying corrective precessional torques in proportion to the sine of the geographical latitude so as to counteract influences of the true rotation of the earth.

19. A device for stabilizing and orienting apparatus mounted on such device, comprising a platform swingable about three axes at right angles to each other, two stabilizing gyros each having a normally vertical axis of precession and a normally horizontal impulse axis, and being so arranged on said platform that said impulse axes are at an angle to each other, other gyroscopic means for maintaining a horizontal axis of said platform in a definite direction, two integrators coordinated to said stabilizing gyros respectively and comprising each a member rotating with a velocity proportional to the speed with which said platform is moving in the direction of the impulse axis of the respectively coordinated stabilizing gyro, and means connected with said stabilizing gyros for setting up torques about their precession axes to counteract influences of the apparent rotation of the earth, said means being controlled by the respective integrators.

20. A device for stabilizing and orienting apparatus mounted on such device, comprising a platform swingable about three axes at right angles to each other, two stabilizing gyros each having a normally vertical axis of precession and a normally horizontal impulse axis, and being so arranged on said platform that said impulse axes are at an angle to each other, a compass gyro, an azimuth gyro for maintaining the platform in a definite direction, said azimuth gyro having a normally horizontal axis of precession, means controlled by said compass gyro for controlling said azimuth gyro, two integrators, means connected with said stabilizing gyros for setting up torques about their precession axes, said means being controlled by said integrators, second means connected with at least one of said stabilizing gyros and with said azimuth gyro for setting up torques about their precession axes, and means for controlling said second means in dependence on functions of the geographical latitude.

21. In a device for stabilizing and orienting apparatus mounted on such device, the combination of a platform swingable about three axes at right angles to each other, with gyroscopic means for maintaining a horizontal axis of said platform in a definite azimuthal position, two other gyroscopic means for stabilizing said platform about two horizontal axes at an angle to each other, each of said other gyroscopic means comprising a gyro box with vertical precession axis, a gyro with horizontal impulse axis rotatable in said box, a frame rigidly connected with said platform and holding said gyro box, a receiver on said frame, a member arranged on said frame so as to swivel, means for displacing said swivelling member through said receiver, and means for exerting a torque about said vertical precession axis, corresponding to the position of the swivelling member, two integrators associated with said other gyroscopic means respectively, and means for controlling the receivers of said two other gyroscopic means respectively through said integrator.

22. In a device for stabilizing and orienting apparatus mounted on such device, the combination of a platform swingable about three axes at right angles to each other, with gyroscopic means for maintaining a horizontal axis of said platform in a definite azimuthal position, two other gyroscopic means for stabilizing said platform about two horizontal axes at an angle to each other, each of said other gyroscopic means comprising a gyro box with vertical precession axis, a gyro with horizontal impulse axis rotatable in said box, a frame rigidly connected with said platform and holding said gyro box, a receiver on said frame a member arranged on said frame so as to swivel, means for displacing said swivelling member through said receiver, means for exerting a torque about said vertical precession axis, corresponding to the position of the swivelling member, two integrators associated with said other gyroscopic means respectively and mounted on said platform, two transmitters associated with said integrators respectively, means for actuating the receivers of said two other gyroscopic means respectively through said transmitters, and means controlled by said integrators for actuating said transmitters depending on the speed of a craft, provided with the device in the direction of the impulse axes of said stabilizing gyros.

23. In a device for stabilizing and orienting apparatus mounted on such device, the combination of a platform swingable about three axes at right angles to each other, with gyroscopic means for maintaining a horizontal axis of said platform in a definite azimuthal direction, two stabilizing gyroscopic means, and means for counteracting influences of the earth's rotation upon said gyroscopic means, each of said stabilizing means comprising a frame rigidly mounted on said platform, a gyro box journaled in said frame and having a normally vertical axis of precession, a gyro with normally horizontal impulse axis rotatable in said box, a receiver mounted on said frame and controlled by said counteracting means, a member arranged on said frame so as to be capable of swivelling, means for swivelling said member by the action of said receiver, and means for exerting a torque about said vertical precession axis, corresponding to the position of said swivelling member, the impulse axes of said stabilizing gyros being arranged at an angle to each other.

24. In a device for stabilizing and orienting apparatus mounted on such device, the combination of a platform swingable about three axes at right angles to each other, with gyroscopic means for maintaining a horizontal axis of said platform in a definite azimuthal direction, two stabilizing gyroscopic means, and means for counteracting influences of the earth's rotation upon said gyroscopic means, each of said stabilizing means comprising a frame rigidly mounted on said platform, a gyro box journaled in said frame and having a normally vertical axis of precession, a gyro with normally horizontal impulse axis rotatable in said box, a receiver mounted on said frame, means for exerting a torque about said vertical precession axis by the action of said receiver, a transmitter, means for actuating said receiver through said transmitter, and means for actuating said transmitter through said counteracting means, depending on the speed of a craft, equipped with the device, in the direction of said impulse axis, the impulse axes of said stabilizing gyros being arranged at an angle to each other.

25. A combination as claimed in claim 24 in which at least one of the stabilizing gyroscopic means further comprises a second receiver, second means for exerting torques about said vertical precession axis by said second receiver, a second transmitter, means for operating the second receiver through said second transmitter, and means for setting said second transmitter according to a function of the geographical latitude.

26. In a device for stabilizing and orienting apparatus mounted on such device, the combination of a platform swingable about three axes at right angles to each other, with gyroscopic means for maintaining said platform in a definite direction, two stabilizing gyroscopic means including gyros having impulse axes one of which is being normally directed east-west and the other north-south, and means for counteracting influences of the earth's rotation upon said gyroscopic means, each of said stabilizing means further comprising a frame rigidly mounted on said platform, a gyro box journaled in said frame and having a normally vertical axis of precession, a gyro with normally horizontal impulse axis rotatable in said box, a receiver mounted on said frame, means for exerting a torque upon said precession axis through said receiver, a transmitter, means for actuating said receiver through said transmitter, and means for actuating said transmitter through said counteracting means, depending on the speed of a craft, equipped with the device, in the direction of said impulse axis, and said stabilizing gyroscopic means with east-west directed impulse axis further comprising a second receiver, second means for exerting torques upon the precession axis by said second receiver, a second transmitter, means for operating the second receiver through said second transmitter, and means for setting said second transmitter according to the cosine of the geographical latitude.

27. In a device for stabilizing and orienting apparatus mounted on such device, the combination of a platform swingable about three axes at right angles to each other, with gyroscopic means for stabilizing said platform about two horizontal axes at an angle to each other, a compass gyro means, an azimuth gyro having two degrees of freedom in a normally horizontal plane, means under the control of the compass gyro for causing precession of said azimuth gyro about a vertical axis, and means for counteracting the influences of the earth's rotation upon said gyroscopic means, said compass gyro means and said azimuth gyro, said compass gyro means comprising a gyro with a normally horizontal impulse axis, a gyro box with a vertical axle eccentrically arranged in relation to the center of the gyro, a first frame in which said vertical axle is journaled, a horizontal axle of said first frame above the center of gravity of said gyro, a member in which said frame axle is journaled, and having a vertical axle with an axis normally passing through the center of gravity of said gyro, a second frame in which said vertical axle is journaled, said second frame being mounted on said platform, a first contact means between said first frame and said member, and a second contact means connected with the second frame and the axle of said member, said contact means being arranged in a circuit containing a current source and said means for causing precessions of said azimuth gyro.

28. A combination as claimed in claim 27 in which said first contact means is so arranged and constructed as to be in a circuit-closing position when said first frame is in its central position, in a vertical plane at right angles to the normal direction of the spinning axis of said compass gyro, and said second contact means is so arranged and constructed as to be capable of closing a circuit when said second frame is off the central position, said first and said second contact means being connected in series, and said means for controlling said azimuth gyro comprising a moment generator at the precession axis of said azimuth gyro.

29. In a device for stabilizing the orienting apparatus mounted on such device, the combination of a platform swingable about three axes at right angles to each other, with gyroscopic means for stabilizing said platform about two horizontal axes at an angle to each other, a compass gyro means, an azimuth gyro having two degrees of freedom in a normally horizontal plane, means under the control of said compass gyro for causing precession of the azimuth gyro about a vertical axis, and means for counteracting the influences of the earth's rotation upon said gyroscopic means, said compass gyro means and said azimuth gyro, said compass gyro means comprising a gyro with a normally horizontal impulse axis, a gyro box with a vertical axle eccentrically arranged in relation to the center of the gyro, a first frame in which said vertical axle is journaled, a horizontal axle of said first frame above the center of gravity of said gyro, elastic means connecting said gyro box to said first frame, a member in which said frame axle is journaled, said member having a vertical axle with an axis normally passing through the center of gravity of said last-mentioned gyro, a second frame in which said vertical axle is journaled, said second frame being mounted on said platform, contact mechanisms between said first frame and said member, and between the axle of said member and said second frame, a swinging mass adapted to oscillate about the axis of said member axle, and normally arranged opposite to the center of gravity of the gyro with respect to said gyro box axle, and means for subjecting said member axle to torques through said swinging mass and said counteracting means.

30. The combination of a device as claimed in claim 29 in which said compass gyro means further comprises an eddy current brake including a brake disk rotatable about the axis of said swinging mass, elastic means for connecting said swinging mass to said brake disk, and means for connecting said member axle to the brake disk for simultaneous rotation.

31. In a device for stabilizing and orienting apparatus mounted on such device, the combination of a platform swingable about three axes at right angles to each other, a stabilizing gyro with an east-west impulse axis, another stabilizing gyro with a north-south impulse axis, both stabilizing gyros having vertical axes of precession, a compass gyro, an azimuth gyro having two degrees of freedom in a normally horizontal plane, means under the control of the compass gyro to cause precession of the azimuth gyro about a vertical axis so as to maintain the platform in a definite azimuthal direction, said compass gyro having a horizontal and a vertical axis of precession, first means responsive to accelerations and comprising a member moving with a speed proportional to the speed of a craft, equipped with the device, in east-west direction, second means responsive to accelerations and comprising a member moving with a speed proportional to the craft's speed in north-south direction, individual means for setting up torques at the stabilizing gyros about their precession axes, and at said compass gyro about its vertical precession axis, said individual means at said stabilizing gyro with east-west directed impulse axis being controlled by said first means, and said individual means at said other stabilizing gyro and at said compass gyro being controlled by said second means.

32. In a device for stabilizing and orienting apparatus mounted on such device, the combination of a platform swingable about three axes at right angles to each other, with gyroscopic means for stabilizing said platform about two horizontal axes at an angle to each other, an azimuth gyro having two degrees of freedom in a horizontal plane, means under the control of said compass gyro to cause precession of the azimuth gyro about a vertical axis so as to maintain said platform in a definite azimuthal direction, a compass gyro, said compass gyro having a horizontal and a vertical axis of precession, means responsive to movements of said compass gyro about its horizontal and its vertical axes of precession for controlling said azimuth gyro, and means for setting up precessional torques about selected axes of said gyroscopic means and said gyros so as to counteract the influences of the earth's rotation.

BIANCA BOYKOW,
    ERIKA BOYKOW,
    JOHANN MARIA BOYKOW,
*Sole heirs of Johann Maria Boykow, Deceased.*